US010067232B2

United States Patent
Halloran et al.

(10) Patent No.: US 10,067,232 B2
(45) Date of Patent: *Sep. 4, 2018

(54) AUTONOMOUS ROBOT LOCALIZATION

(71) Applicant: iRobot Corporation, Bedford, MA (US)

(72) Inventors: Mike Halloran, Bedford, MA (US); Jamie Milliken, Waltham, MA (US); Travis Pierce, Bedford, NH (US); Eric Charles Peters, Carlisle, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,894

(22) Filed: Dec. 5, 2016

(65) Prior Publication Data

US 2017/0146654 A1   May 25, 2017

Related U.S. Application Data

(63) Continuation of application No. 14/512,013, filed on Oct. 10, 2014, now Pat. No. 9,510,505.

(51) Int. Cl.
 *G01S 17/48* (2006.01)
 *G05D 1/02* (2006.01)
 (Continued)

(52) U.S. Cl.
 CPC ............ *G01S 17/48* (2013.01); *A01D 34/008* (2013.01); *G01S 7/4813* (2013.01); *G01S 7/4817* (2013.01);
 (Continued)

(58) Field of Classification Search
 CPC ........ G01S 17/48; G01S 17/06; G01S 7/4868; G01S 17/42; G01S 13/46; G01S 17/936;
 (Continued)

(56) References Cited

U.S. PATENT DOCUMENTS 2,751,030 A   6/1956 Null
3,128,840 A   4/1964 Barrett
(Continued)

FOREIGN PATENT DOCUMENTS

DE   19932552   2/2000
EP   0792726    9/1997
(Continued)

OTHER PUBLICATIONS

E. Casanova, S. Quijada, J. Garcia-Bermejo and J. Gonzalez, "Microcontroller based system for 2D localization," Mechatronics 15, 2005, pp. 1109-1126.*

(Continued)

*Primary Examiner* — Peter D Nolan
(74) *Attorney, Agent, or Firm* — Fish & Richardson P.C.

(57) ABSTRACT

A location estimation system for use with an autonomous lawn mowing robot, comprises a plurality of synthetic surfaces positioned with respect to a mowable space in an environment, a radiation source coupled to the lawn mowing robot, a detector coupled to the lawn mowing robot and configured to detect radiation reflected by objects in the environment, and a controller configured to controllably direct radiation from the radiation source to scan the environment, and to vary at least one of an output power of the directed radiation and a scan rate of the directed radiation, as a function of detected radiation reflected from one or more of the synthetic surfaces.

30 Claims, 14 Drawing Sheets

(51) Int. Cl.
  *A01D 34/00* (2006.01)
  *G01S 7/481* (2006.01)
  *G01S 17/06* (2006.01)
  *G01S 17/93* (2006.01)
  *G01S 13/46* (2006.01)
  *G01S 17/42* (2006.01)
  *G01S 7/486* (2006.01)
  *A01D 101/00* (2006.01)

(52) U.S. Cl.
  CPC ............ *G01S 7/4868* (2013.01); *G01S 13/46* (2013.01); *G01S 17/06* (2013.01); *G01S 17/42* (2013.01); *G01S 17/936* (2013.01); *G05D 1/0236* (2013.01); *G05D 1/0259* (2013.01); *A01D 2101/00* (2013.01); *G05D 2201/0208* (2013.01)

(58) Field of Classification Search
  CPC ... G01S 7/4817; G01S 7/4813; G05D 1/0236; G05D 1/0259; G05D 2201/0208; A01D 34/008; A01D 2101/00
  See application file for complete search history.

(56) References Cited

U.S. PATENT DOCUMENTS

| | | |
|---|---|---|
| 3,385,041 A | 5/1968 | Douglas |
| 3,457,575 A | 7/1969 | Bienek |
| 3,550,714 A | 12/1970 | Bellinger |
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,328,545 A | 5/1982 | Halsall et al. |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,777,416 A | 10/1988 | George et al. |
| 4,782,550 A | 11/1988 | Jacobs |
| 4,796,198 A | 1/1989 | Boultinghouse et al. |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Stearns et al. |
| 5,163,202 A | 11/1992 | Kawakami et al. |
| 5,163,273 A | 11/1992 | Wojtkowski et al. |
| 5,164,579 A | 11/1992 | Pryor et al. |
| 5,165,064 A | 11/1992 | Mattaboni |
| 5,204,814 A | 4/1993 | Noonan et al. |
| 5,208,521 A | 5/1993 | Aoyama |
| 5,216,777 A | 6/1993 | Mom et al. |
| 5,239,720 A | 8/1993 | Wood et al. |
| 5,261,139 A | 11/1993 | Lewis |
| 5,279,672 A | 1/1994 | Belker et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,786,602 A | 7/1998 | Pryor et al. |
| 5,787,545 A | 8/1998 | Colens |
| 5,794,297 A | 8/1998 | Muta |
| 5,812,267 A | 9/1998 | Everett et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |

(56) References Cited

U.S. PATENT DOCUMENTS

| | | |
|---|---|---|
| 6,076,227 A | 6/2000 | Schalig et al. |
| 6,108,067 A | 8/2000 | Hanseder |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 | 7/2001 | Peless et al. |
| 6,259,979 B1 | 7/2001 | Holmquist |
| 6,285,930 B1 | 9/2001 | Dickson et al. |
| 6,300,737 B1 | 10/2001 | Begvall et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Colens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Raffner |
| 6,615,108 B1 | 9/2003 | Peless et al. |
| 6,658,693 B1 | 12/2003 | Reed |
| 6,661,239 B1 | 12/2003 | Ozik |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| 6,901,624 B2 | 6/2005 | Mori et al. |
| D510,066 S | 9/2005 | Hickey et al. |
| 6,938,298 B2 | 9/2005 | Aasen |
| 6,940,291 B1 | 9/2005 | Ozik |
| 6,956,348 B2 | 10/2005 | Landry et al. |
| 6,971,140 B2 | 12/2005 | Kim |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,706,917 B1 | 4/2010 | Chiappetta et al. |
| 7,729,801 B2 | 6/2010 | Abramson |
| 8,046,103 B2 | 10/2011 | Abramson et al. |
| 8,069,639 B2 | 12/2011 | Fancher |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,767,190 B2 * | 7/2014 | Hall .............. G01S 17/89 356/3.01 |
| 8,781,627 B2 | 7/2014 | Sandin et al. |
| 8,868,237 B2 | 10/2014 | Sandin et al. |
| 8,930,127 B2 | 1/2015 | Shimshoni et al. |
| 8,954,193 B2 | 2/2015 | Sandin et al. |
| 8,972,052 B2 | 3/2015 | Chiappetta |
| 9,043,952 B2 | 6/2015 | Sandin et al. |
| 9,043,953 B2 | 6/2015 | Sandin et al. |
| 9,471,063 B2 | 10/2016 | Ouyang |
| 2001/0047231 A1 | 11/2001 | Peless et al. |
| 2002/0015521 A1 | 2/2002 | Kim |
| 2002/0016649 A1 | 2/2002 | Jones |
| 2002/0049517 A1 | 4/2002 | Ruffner |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0011813 A1 | 11/2002 | Koselka et al. |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Coleus |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |

(56) References Cited

U.S. PATENT DOCUMENTS

| | | | |
|---|---|---|---|
| 2005/0007057 | A1 | 1/2005 | Peless et al. |
| 2005/0010331 | A1 | 1/2005 | Taylor et al. |
| 2005/0020374 | A1 | 1/2005 | Wang |
| 2005/0097952 | A1 | 5/2005 | Steph |
| 2005/0108999 | A1 | 5/2005 | Bucher |
| 2005/0113990 | A1 | 5/2005 | Peless et al. |
| 2005/0156562 | A1 | 7/2005 | Cohen et al. |
| 2005/0204717 | A1 | 9/2005 | Colens |
| 2005/0251292 | A1 | 11/2005 | Casey et al. |
| 2005/0278094 | A1 | 12/2005 | Swinbanks et al. |
| 2005/0287038 | A1 | 12/2005 | Dubrovsky et al. |
| 2006/0293794 | A1 | 12/2006 | Harwig et al. |
| 2007/0016328 | A1 | 1/2007 | Ziegler et al. |
| 2007/0142964 | A1 | 6/2007 | Abramson |
| 2007/0150109 | A1 | 6/2007 | Peless et al. |
| 2007/0276590 | A1 | 6/2007 | Peless et al. |
| 2008/0039974 | A1* | 2/2008 | Sandin ............... G05D 1/0255 700/258 |
| 2008/0097645 | A1 | 4/2008 | Abramson et al. |
| 2008/0167753 | A1 | 7/2008 | Peless et al. |
| 2008/0183349 | A1 | 7/2008 | Abramson et al. |
| 2008/0309949 | A1 | 12/2008 | Rueb |
| 2009/0254218 | A1 | 10/2009 | Sandin et al. |
| 2010/0059000 | A1 | 3/2010 | Bergquist |
| 2010/0102525 | A1 | 4/2010 | Fancher |
| 2010/0256908 | A1* | 10/2010 | Shimshoni ............ G01S 17/875 701/300 |
| 2011/0130875 | A1 | 6/2011 | Abramson |
| 2011/0234153 | A1 | 9/2011 | Abramson |
| 2012/0041594 | A1 | 2/2012 | Abramson et al. |
| 2012/0063269 | A1 | 3/2012 | Chung et al. |
| 2012/0085820 | A1 | 4/2012 | Morgan et al. |
| 2012/0226381 | A1 | 9/2012 | Abramson et al. |
| 2013/0006419 | A1 | 1/2013 | Bergstrom et al. |
| 2013/0030609 | A1 | 1/2013 | Jagenstedt |
| 2013/0066484 | A1 | 3/2013 | Markusson et al. |
| 2013/0076304 | A1 | 3/2013 | Andersson et al. |
| 2013/0110322 | A1 | 5/2013 | Jagenstedt et al. |
| 2013/0152538 | A1 | 6/2013 | Fiser et al. |
| 2013/0184924 | A1 | 7/2013 | Jagenstedt et al. |
| 2013/0241761 | A1 | 9/2013 | Cooper et al. |
| 2013/0249179 | A1 | 9/2013 | Burns |
| 2013/0253701 | A1 | 10/2013 | Burnett et al. |
| 2013/0274920 | A1 | 10/2013 | Abramson et al. |
| 2014/0102061 | A1 | 4/2014 | Sandin et al. |
| 2014/0102062 | A1 | 4/2014 | Sandin et al. |
| 2014/0117892 | A1 | 5/2014 | Coates |
| 2014/0247116 | A1 | 9/2014 | Davidson et al. |
| 2014/0249571 | A1 | 9/2014 | Halloran et al. |
| 2015/0006015 | A1 | 1/2015 | Sandin et al. |
| 2015/0289111 | A1 | 10/2015 | Ozkan |
| 2016/0026185 | A1 | 1/2016 | Smith et al. |
| 2016/0065719 | A1 | 3/2016 | Jeong |

FOREIGN PATENT DOCUMENTS

| | | |
|---|---|---|
| EP | 0774702 | 10/2001 |
| EP | 1331537 | 7/2003 |
| EP | 1704766 | 12/2008 |
| EP | 2787368 | 10/2014 |
| EP | 2946650 | 11/2015 |
| FR | 2828589 | 2/2003 |
| GB | 2142447 | 1/1985 |
| GB | 2283838 | 5/1995 |
| GB | 2344745 | 6/2000 |
| GB | 2382157 | 5/2003 |
| JP | S59104503 | 6/1984 |
| JP | 62120510 | 6/1987 |
| JP | 62154008 | 7/1987 |
| JP | 63183032 | 7/1988 |
| JP | 63241610 | 10/1988 |
| JP | 2-6312 U | 1/1990 |
| JP | 3051023 | 3/1991 |
| JP | 04320612 | 11/1992 |
| JP | 06327598 | 11/1994 |
| JP | 07129239 | 5/1995 |
| JP | 7295636 | 11/1995 |
| JP | 816776 | 1/1996 |
| JP | 08089451 | 4/1996 |
| JP | 8152916 | 6/1996 |
| JP | 09179625 | 7/1997 |
| JP | 9185410 | 7/1997 |
| JP | 11-508810 | 8/1999 |
| JP | 11-510935 | 9/1999 |
| JP | 2001-258807 | 9/2001 |
| JP | 2001-275908 | 10/2001 |
| JP | 2001-525567 | 12/2001 |
| JP | 2002-078650 | 3/2002 |
| JP | 2002-204768 | 7/2002 |
| JP | 2002-532178 | 10/2002 |
| JP | 3356170 | 10/2002 |
| JP | 2002-323925 | 11/2002 |
| JP | 3375843 | 11/2002 |
| JP | 2002-355206 | 12/2002 |
| JP | 2002-360471 | 12/2002 |
| JP | 2002-360482 | 12/2002 |
| JP | 2003-005296 | 1/2003 |
| JP | 2003-010076 | 1/2003 |
| JP | 2003-036116 | 2/2003 |
| JP | 2003-038401 | 2/2003 |
| JP | 2003-038402 | 2/2003 |
| JP | 2003-505127 | 2/2003 |
| JP | 2003-061882 | 3/2003 |
| JP | 2003-310489 | 11/2003 |
| WO | 1995/026512 | 10/1995 |
| WO | 1997/040734 | 11/1997 |
| WO | 1997/041451 | 11/1997 |
| WO | 1998/053456 | 11/1998 |
| WO | 1999/016078 | 4/1999 |
| WO | 1999/028800 | 6/1999 |
| WO | 1999/038056 | 7/1999 |
| WO | 1999/038237 | 7/1999 |
| WO | 1999/059042 | 11/1999 |
| WO | 2000/004430 | 1/2000 |
| WO | 2000/036962 | 6/2000 |
| WO | 2000/038026 | 6/2000 |
| WO | 2000/038029 | 6/2000 |
| WO | 2000/078410 | 12/2000 |
| WO | 2001/006904 | 2/2001 |
| WO | 2001/006905 | 2/2001 |
| WO | 2002008842 | 1/2002 |
| WO | 2002/039864 | 5/2002 |
| WO | 2002/039868 | 5/2002 |
| WO | 2002/058527 | 8/2002 |
| WO | 2002/062194 | 8/2002 |
| WO | 2002/067744 | 9/2002 |
| WO | 2002/067745 | 9/2002 |
| WO | 2002/074150 | 9/2002 |
| WO | 2002/075356 | 9/2002 |
| WO | 2002/075469 | 9/2002 |
| WO | 2002/075470 | 9/2002 |
| WO | 2002/101477 | 12/2002 |
| WO | 2003/026474 | 4/2003 |
| WO | 2003/040845 | 5/2003 |
| WO | 2003/040846 | 5/2003 |
| WO | 2003/065140 | 8/2003 |
| WO | 2004/004533 | 1/2004 |
| WO | 2004/006034 | 1/2004 |
| WO | 2004/058028 | 7/2004 |
| WO | 2005/055795 | 6/2005 |
| WO | 2005/077244 | 8/2005 |
| WO | 2006/068403 | 6/2006 |

OTHER PUBLICATIONS

"Electrolux—Designed for the well-lived home (Welcome to the Electrolux Trilobite)," Retrieved from the Internet: URL<http://www.electroluxusa.com/node57.as[?currentURL=node142.asp%3F >. Accessed Mar. 2005, 2 pages.
"EVac Robotic Vacuum," S1727 Instruction Manual, Sharper Image Corp, Copyright 2004, 13 pages.

(56) References Cited

OTHER PUBLICATIONS

"Put Your Roomba . . . On, Automatic" webpages: http://www.acomputeredge.com/roomba, accessed Apr. 2005, 3 pages.
"Zoombot Remote Controlled Vaccuum-RV-500 New Roomba 2," eBay website: http://cgi.ebay.com/ws/eBayISAPI.dll?ViewItem&category=43526&item=4373497618&rd=1, accessed Apr. 2005, 7 pages.
Angle et al., U.S. Appl. No. 60/177,703, filed Jan. 24, 2000, accessed Jul. 11, 2012, 16 pages.
Bohn et al. "Super-distributed RFID Tag Infrastructures," Lecture Notes in Computer Science, Springer Verlag, Berlin, DE, vol. 3295, Nov. 11, 2004, pp. 1-12.
Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.
Caracciolo et al., "Trajectory Tracking Control of a Four-Wheel Differentially Driven Mobile Robot," IEEE Int Conf. Robotics and Automation, Detroit, MI, 1999, pp. 2632-2638.
Casanova et al., "Microcontroller based system for 2D localization," Mechatronics 15, 2005, pp. 1109-1126.
Casey et al., U.S. Appl. No. 60/582,992, filed Jun. 25, 2004, accessed Jul. 11, 2012, 24 pages.
Domnitcheva "Smart Vacuum Cleaner—An Autonomous Location-Aware Cleaning Device," Proceedings of the International Conference on Ubiquitous Computing, Sep. 10, 2004, pp. 1-2.
Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.
Everyday Robots, "Everyday Robots: Reviews, Discussion and News for Consumers," Aug. 2004, Retrieved from the Internet: URL<www.everydayrobots.com/index.php?option=content&task=view&id=9>, retrieved Sep. 2012, 4 pages.
Evolution Robotics, "NorthStar—Low-cost Indoor Localization—How it Works," E Evolution Robotics, 2005, 2 pages.
Facts on Trilobite, webpage, Retrieved from the Internet: URL<http://trilobitedectroluxse/presskit_en/model11335asp?print=yes&pressID=>, accessed Dec. 2003, 2 pages.
Final Office Action issued in U.S. Appl. No. 11/688,225, dated Nov. 10, 2011, 45 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
Hicks and Hall, "A Survey of Robot Lawn Mowers", http://www.robotics.uc.edu/papers/paper2000/lawnmower.pdf, 2000, 8 pages.
Hitachi: News release: "The home cleaning robot of the autonomous movement type (experimental machine) is developed," May 29, 2003, Retrieved from the Internet: URL<www.i4u.com/japanreleases/hitachirobot.htm>, retrieved Mar. 2005, 5 pages.
International Preliminary Report on Patentability issued in International Application No. PCT/US2007/064323, dated Sep. 23, 2008, 10 pages.
International Preliminary Report on Patentability in International Application No. PCT/2015/048270, dated Apr. 11, 2017, 8 pages.
International Search Report and Written Opinion in International Application No. PCT/US2015/048270, dated Dec. 4, 2015, 12 pages.
International Search Report and Written Opinion issued in PCT/US2007/064326, dated Jul. 17, 2008, 6 pages.
International Search Report and Written Opinion issued in PCT/US2007/064323, dated Jun. 16, 2008, 14 pages.
International Search Report and Written Opinion issued in PCT/US2016/043541, dated Oct. 7, 2016, 8 pages.
Invitation to Pay Additional Fees issued in International Application No. PCT/US2007/064326, dated Apr. 18, 2008, 9 pages.
Kahney, "Wired News: Robot Vacs are in the House," Jun. 2003, Retrieved from the Internet: URLwww.wired.com/news/technology/o.1282.59237.00.html, accessed Mar. 2005, 5 pages.
Karcher "Karcher RoboCleaner RC 3000," Retrieved from the Internet: URLwww.robocleaner.de/english/screen3.html, accessed Dec. 2003, 4 pages.
Karcher USA, "RC3000 Robotic Cleaner," 2005, Retrieved from the Internet: URL http://www.karcher-usa.com/showproducts.php?op=view prod¶ml=143&param2=&param3=, accessed Mar. 2005, 3 pages.
Karcher, "Product Manual Download 'Karch'," available at www.karcher.com, 2004, 16 pages.
Karcher, RC 3000 Cleaning Robot—User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.
Koolvac Robotic Vacuum Cleaner Owner's Manual, Koolatron, 2004, 13 pages.
Kozlowski and Pazderski, "Modeling and Control of a 4-wheel Skid-steering Mobile Robot," International J. of Applied Mathematics and Computer Science, 2004, 14(4):477-496.
Kubitz et al., "Application of radio frequency identification devices to support navigation of autonomous mobile robots" Vehicular Technology Conference, vol. 1, May 4, 1997, pp. 126-130.
Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.
Morland,"Autonomous Lawnmower Control," Downloaded from the internet at: http://cns.bu.edu/~cjmorlan/robotics/lawnmower/report.pdf, Jul. 2002, 10 pages.
Non-final Office Action issued in U.S. Appl. No. 11/688,213, dated Jan. 27, 2011, 27 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 12/488,094, dated Jul. 28, 2011, 13 pages.
On Robo, "Robot Reviews Samsung Robot Vacuum (VC-RP30W)," 2005, Retrieved from the Internet: URL www.onrobo.com/reviews/AT_Home/vacuum_cleaners/on00vcrb30rosam/index.htm, accessed Mar. 2005, 2 pages.
RoboMaid Sweeps Your Floors So You Won't Have to, the Official Site, Retrieved from the Internet: URLhttp://therobomaid.com/, accessed Mar. 2005, 2 pages.
Robotic Vacuum Cleaner—Blue, Retrieved from the Internet: URL http://www.sharperimage.com/us/en/catalog/productview.jhtml?sku=S1727BLU, accessed Mar. 2005, 2 pages.
Schofield, "Neither Master Nor Slave—A Practical Study in the Development and Employment of Cleaning Robots," Emerging Technologies and Factory Automation, 1999 Proceedings ETFA '99 1999 7th IEEE International Conference on Barcelona, Spain, Oct. 1999, pp. 1427-1434.
TheRobotStore.com, "Friendly Robotics Robotic Vacuum RV400—The Robot Store," www.therobotstore.com/s.nl/sc.9/category.-109/it.A/id.43/.f, accessed Apr. 2005, 1 page.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.
Supplementary European Search Report in European Patent Application No. 15849479, dated Apr. 20, 2018, 5 pages.

* cited by examiner

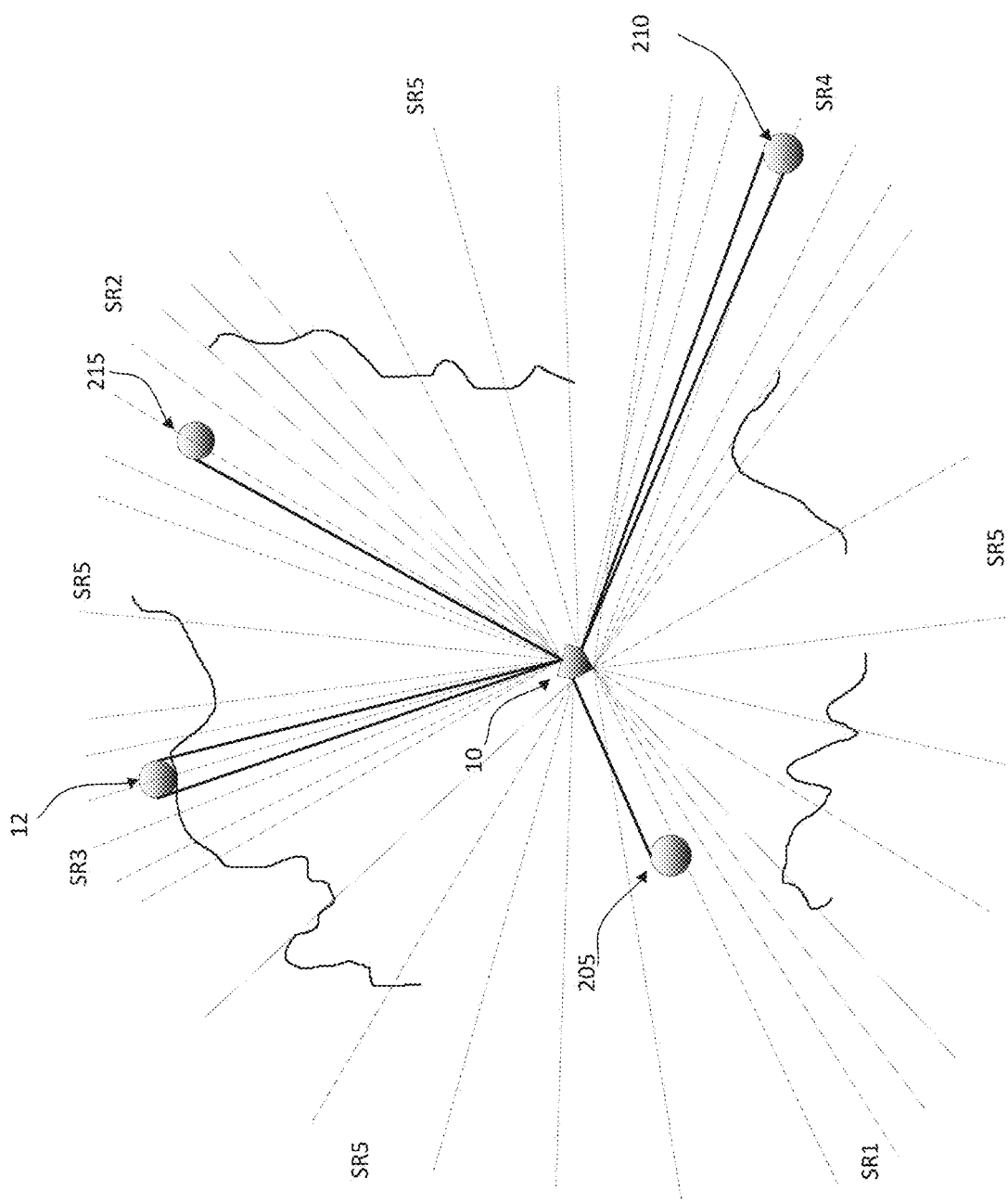

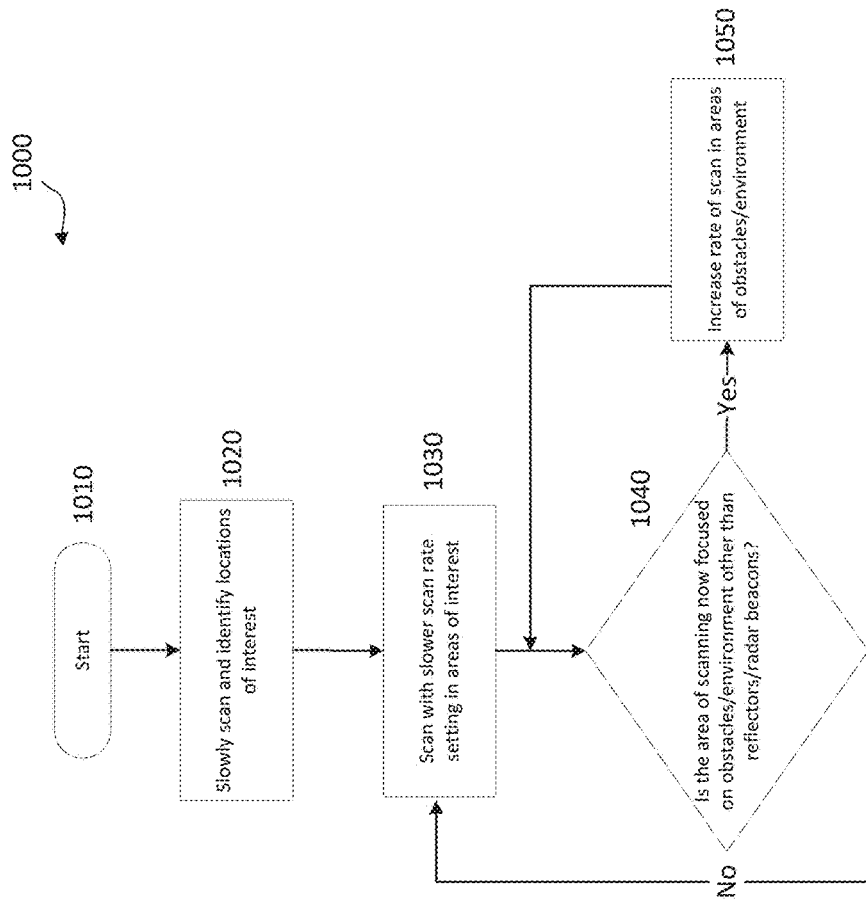

AUTONOMOUS ROBOT LOCALIZATION

CROSS-REFERENCE TO RELATED APPLICATIONS

This application is a continuation of and claims priority to U.S. application Ser. No. 14/512,013, filed on Oct. 10, 2014, the entire contents of which are hereby incorporated by reference.

TECHNICAL FIELD

This invention relates to autonomous robot localization.

BACKGROUND

Autonomous robots that perform household functions such as floor cleaning and lawn cutting are now readily available consumer products. Commercially successful robots are not unnecessarily complex, and generally operate randomly within a confined area. In the case of floor cleaning, such robots are generally confined within (i) touched walls and other obstacles within the rooms of a dwelling, (ii) IR-detected staircases (cliffs) down; and/or (iii) user placed detectable barriers such as directed IR beams, physical barriers or magnetic tape. Other robots map the dwelling using a complex system of sensors and/or active or passive beacons (e.g., sonar, RFID or bar code detection, or various kinds of machine vision).

Some consumer robotic lawn mowers use a similar "invisible" barrier—a continuous guide conductor boundary (e.g., a boundary wire) for confining random motion robotic mowers. The boundary wire is intended to confine the robot within the lawn or other appropriate area, so as to avoid damaging non-grassy areas of the yard or intruding onto a neighboring property. Some consumer robotic lawn mowers use localization systems that make use of triangulation to determine the robot position within the boundary. For example, multiple beacons are positioned around the property to be mowed. Signals sent between the beacons and the lawnmower positioned in the property allow the lawnmower to estimate the angles and the distance by calculating time-of-flight to each of the beacons, and using trigonometry to calculate the robot's current position. In another example, the system can triangulate the distance to an object using a fixed-angle laser pointer and a CMOS imager, with a baseline between the two. In such examples, the pixel location of the received signal at the imager is indicative of the distance to the object.

There are several challenges in determining the position of an outdoor robot within a barrier. The resolution of current commercially available GPS applications is inadequate for this application (e.g., resolution is insufficient to prevent the lawnmower from not mowing a flower bed or other "no-mow" zone), particularly in light of tree cover commonly found in lawns. The variation in terrain also makes it difficult for the robot to "see" boundary markers; tilt or slant in the lawn can cause a moving mower having a sweeping beacon detector to not engage, or miss, a beacon. The additional costs and power requirements to improve these factors are important for consumers.

SUMMARY

In some implementations, a location estimation system for use with an autonomous lawn mowing robot, the system comprises a plurality of synthetic surfaces positioned with respect to a mowable space in an environment, a radiation source coupled to the lawn mowing robot, a detector coupled to the lawn mowing robot and configured to detect radiation reflected by objects in the environment, and a controller configured to controllably direct radiation from the radiation source to scan the environment, and to vary at least one of an output power of the directed radiation and a scan rate of the directed radiation, as a function of detected radiation reflected from one or more of the synthetic surfaces. In further implementations, the controller is configured to vary a spin rate of the radiation source. The location estimation system comprises a modulator coupled to the radiation source and configured to modulate radiation emitted from the radiation source. The controller is configured to direct the modulator to vary the output power of the radiation source in response to detection of reflected radiation. The controller is configured to direct the modulator to vary a beam focus of the radiation source in response to detection of reflected radiation.

In further implementations, the location estimation system comprises a mechanical scanner that directs radiation from the radiation source to scan the environment. The system comprises a rotational scanner that directs radiation from the radiation source to scan the environment. The controller is further configured to compare data indicative of detected reflected radiation to stored data, and to identify the detected radiation as radiation reflected from a particular object associated with the stored data. The particular object is one of the synthetic surfaces. The particular object is a stationary non-retroreflective object within the environment. The controller is further configured to direct the radiation source to make a first scan of the environment at a first scan rate. The controller is configured to direct the radiation source to make a second scan of the environment at a second scan rate different from the first scan rate. The modulator is configured to direct the radiation source to make a second scan of the environment, a limited portion of the second scan performed at a second scan rate different from the first scan rate. The system further comprises a second detector of a different wavelength responsiveness than a first detector. The radiation source is a laser. The radiation is emitted across a distributed plane. The plane extends at 45 degrees to a surface supporting the autonomous lawn mowing robot. The controller is configured to modulate the output power of the radiation source. The controller is configured to perform a scan of the environment and to store resulting data indicative of reflected radiation detected by the detector during the scan. The synthetic surfaces are positioned at locations bordering the environment. The radiation source scans during a motion of the autonomous lawn mowing robot. The controller is coupled to the autonomous lawn mowing robot.

In other aspects of this disclosure, a method of estimating a location of a self-propelled lawn mowing robot in an environment, the method comprises positioning a plurality of synthetic surfaces at locations with respect to a mowable space in an environment, and placing a lawn mowing robot in the environment, the robot comprising: a radiation source coupled to the lawn mowing robot, a detector coupled to the lawn mowing robot and configured to detect radiation reflected by objects in the environment, and a controller configured to controllably direct radiation from the radiation source to scan the environment, and to vary at least one of an output power of the directed radiation and a scan rate of the directed radiation, as a function of detected radiation reflected from one or more of the synthetic surfaces. In the method the controller is configured to control the controller to vary the scan rate of the radiation source. Also included can be a modulator coupled to the radiation source and configured to modulate radiation emitted from the radiation source. The controller is configured to direct the modulator to vary the output power of the radiation source in response to detection of reflected radiation. The controller is configured to direct the modulator to vary a beam focus of the radiation source in response to detection of reflected radiation. The modulator scans a portion of a second scan at a scan speed different from at least a portion of the scan speed of a first scan. Positioning a plurality of synthetic surfaces comprises positioning the surfaces at locations bordering the environment. The controller scans the environment during a motion of the robot. The motion of the robot includes a grass cutting action.

In further implementations, an autonomous robot comprises a body configured to move over a surface, two driven wheels carried by the body and defining a transverse axis, with each wheel carried on a respective side of the body, a radiation source coupled to the autonomous robot, a detector coupled to the autonomous mowing robot and configured to detect radiation reflected by objects in the environment, and a controller configured to controllably direct radiation from the radiation source to scan the environment, and to vary at least one of an output power of the directed radiation and a scan rate of the directed radiation, as a function of detected radiation reflected from one or more of synthetic surfaces placed in the environment. In some embodiments, the controller is configured to vary the scan rate of the radiation source. A modulator coupled to the radiation source is configured to modulate radiation emitted from the radiation source. The controller is configured to direct the modulator to vary the output power of the radiation source in response to detection of reflected radiation. The controller is configured to direct the modulator to vary a beam focus of the radiation source in response to detection of reflected radiation. A blade is attached to the body. An odometer is in communication with the wheels, wherein the controller is further configured to compare the position of the robot resulting from the identified radiation to a position of the robot indicated by the odometer. The controller is further configured to drive the wheels so as to change a trajectory of the robot in response to determining the robot position. The radiation source scans during a motion of the robot.

In further implementations, a location estimation system for use with an autonomous lawn mowing robot comprises a plurality of reflective surfaces positioned with respect to a mowable space in an environment, a radiation source coupled to the lawn mowing robot, a detector coupled to the lawn mowing robot and configured to detect radiation reflected by objects in the environment and radiation reflected by the plurality of reflective surfaces, and a processor configured to: identify a signal received by the detector as being associated with one of the plurality of reflective surfaces, compare signals received by the detector at locations near the identified signal to determine environmental characteristics based on radiation reflected by objects in the environment, and determine which of the plurality of reflective surfaces generated the signal received by the detector based on the comparison.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4B is a schematic view illustrating a multivariable scan rate used by the autonomous mobile mowing robot of FIG. 1B, FIG. 5 is a flowchart describing a method for using a variable scan rate.

Like reference symbols in the various drawings indicate like elements.

DETAILED DESCRIPTION

Figure 1A:
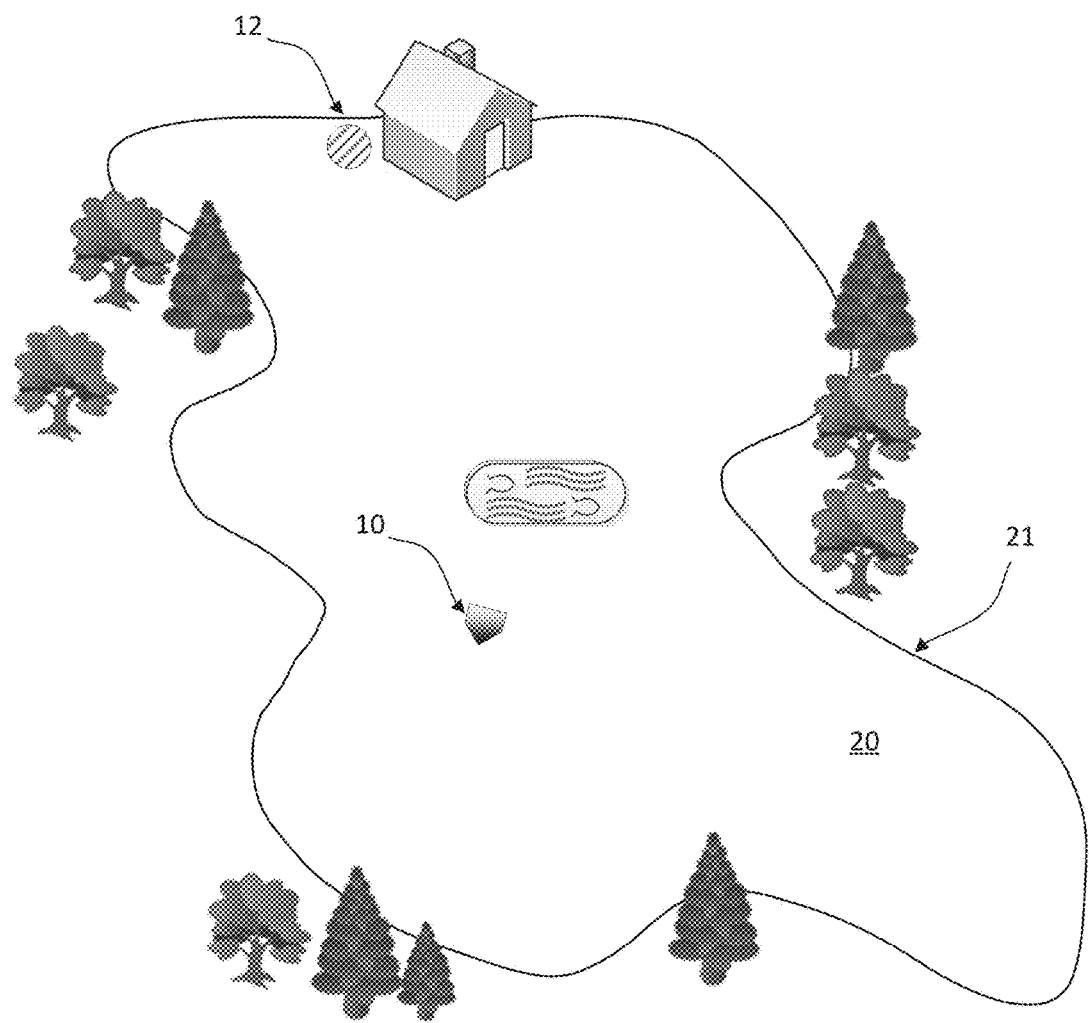
FIG. 1A is a schematic view of an autonomous mobile mowing robot placed on a lawn to be mowed.
Figure 1B:
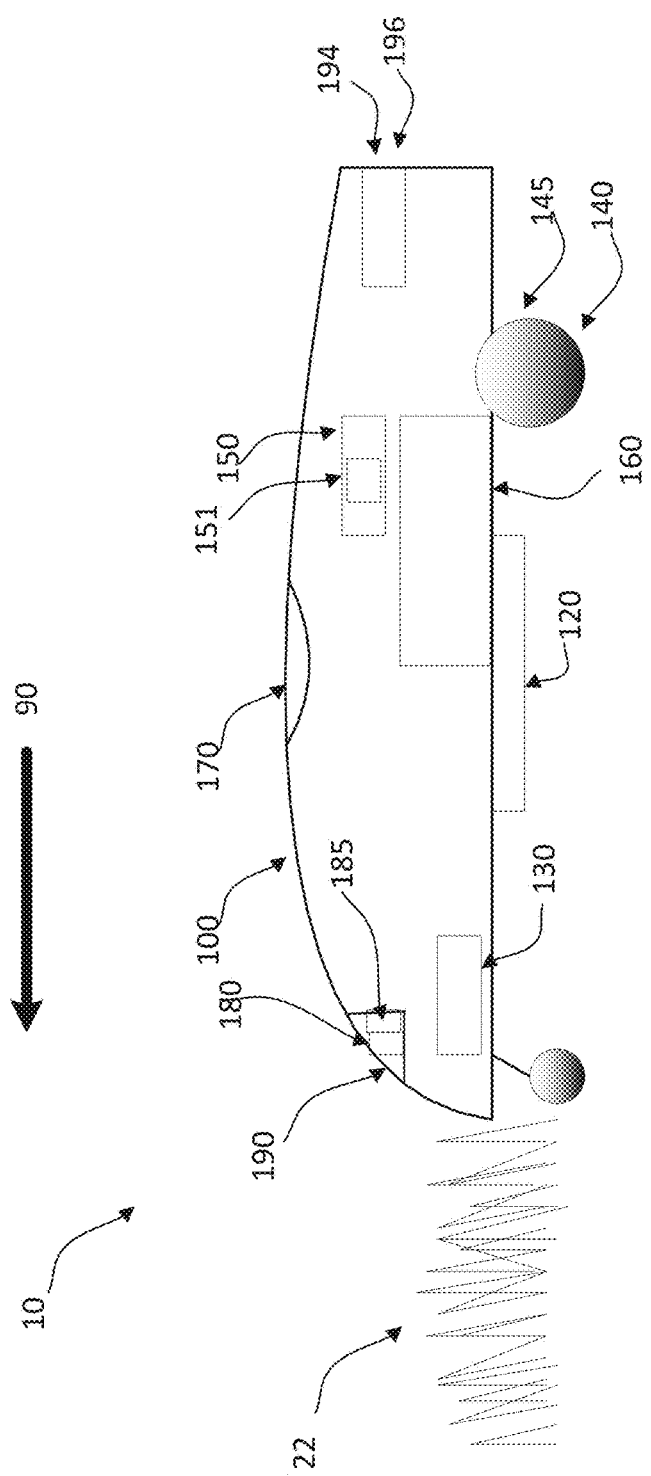
FIG. 1B is a schematic side view of an autonomous mobile mowing robot.
Figure 1C:
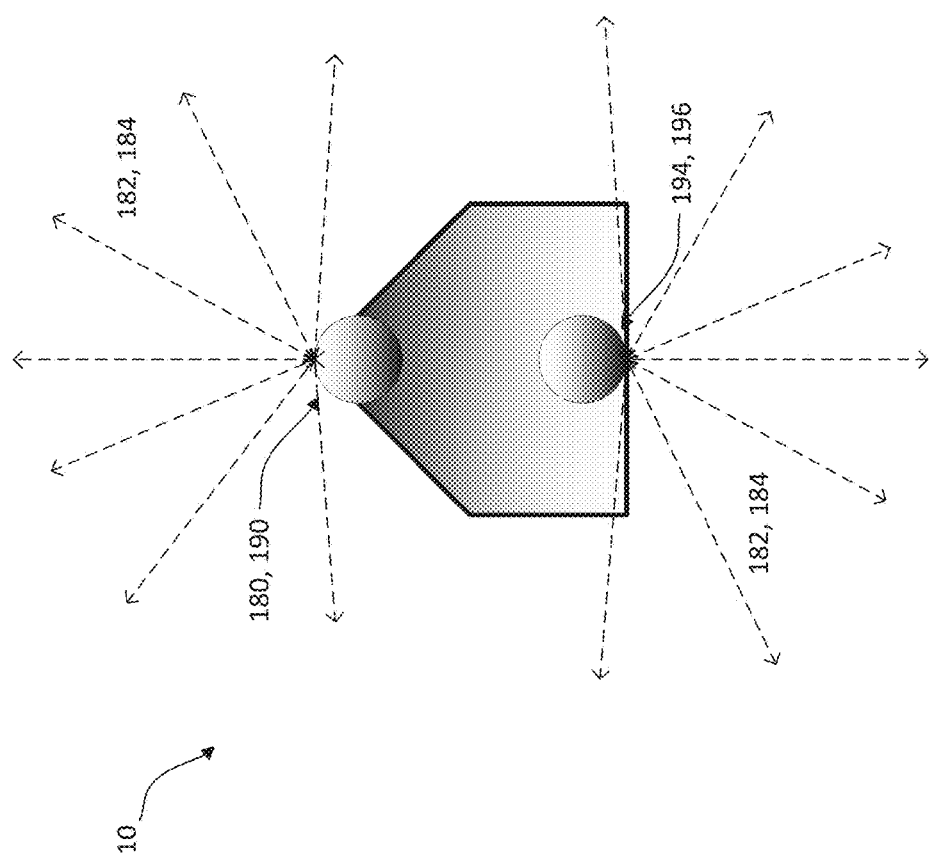
FIG. 1C is a schematic top view of an autonomous mobile mowing robot.

Referring to FIGS. 1A-1C, an autonomous robot lawnmower 10 is configured to mow a lawn 20. The autonomous robot lawnmower 10 moves about the lawn 20 and cuts grass 22 as it is traversing the lawn 20. The robot lawnmower 10 includes a robot body 100, a surface treater 120 secured to the robot body 100, a sensor system 130 having at least one surface sensor 131 carried by the robot body 100 and responsive to at least one surface characteristic, and a drive system 140 including at least one motorized wheel 145. In some examples, the wheel may include a tire, or be a continuous tread or track tread. The drive system 140 is carried by the robot body 100 and configured to maneuver the robot lawnmower 10 across lawn 20. In this example, the surface treater 120 is a reciprocating symmetrical cutter. The robot body 100 also supports a power source 160 (e.g., a battery) for powering any electrical components of the robot lawnmower 10, including the drive system 140, the surface treater 120, and a navigation system. When not mowing the lawn 20, the robot lawnmower 10 may be docked at a base station or dock 12. In some examples, the dock 12 includes a charging system for charging the battery 160 housed by the robot body 100.

A data processor or controller 150 having a memory 151 is attached to the robot body 100 and communicates with and controls a radiation source 180 also attached to the robot body 100. The radiation source 180 can one of several types of radiation used for robot navigation, such as a lidar (light or laser) source, or a radar source. Laser or radar sources are particularly advantageously suited for use in the navigation embodiments described herein. In some examples, the radiation source is attached to the robot on a rotating platform or other scanner that is configured to cause the beam to scan about the environment in predetermined angular increments (e.g., one degree increments).

The controller 150 also communicates with a modulator 185 coupled to the radiation source. The modulator 185 modulates the radiation emitted from the radiation source 180. For example, the modulator 185 can modify the beam focus, the beam power, and/or range of the beam of radiation supplied by the radiation source 180 and emitted by the robot lawnmower 10. The radiation source 180, modulator 185, and controller 150 are also in communication with a radiation detector or receiver 190 that detects incoming radiation incident on the robot lawnmower 10. As shown in FIGS. 1B-1C, the robot lawnmower 10 can have a first radiation source 180 and detector 190 pair at the front of the robot body 100 (the front of the robot being in the direction of normal robot motion indicated by arrow 90). The first radiation source 180 and detector 190 pair 180, 190 can emit signals 182 toward and detect signals 184 from an approximate 180° region around the front of the robot lawnmower 10. The robot lawnmower 10 can also include a second radiation source and detector pair 194, 196 at the back of the robot body 100. The rearward radiation source and detector pair 194, 196 can likewise emit signals 182 toward and detect signals 184 from an approximate 180° region around the back of the robot. Alternatively, the radiation source and detector can be spaced from each other on the robot body 100, rather than co-located as a pair. In some embodiments, the robot lawnmower 10 can have a radiation source and detector located on the top of the robot body 100 which can rotate to emit radiation in a 360 degree radius about the robot lawn mower 10. In any of these embodiments, the robot lawnmower is configured to emit/detect signals (e.g., scan) 360° around the robot body 100.

The controller 150 also communicates with the other systems of the robot, e.g., the drive system 140, the surface sensor 131, and the surface treater 120. The robot lawnmower 10 can also include a user interface system 170, which allows a human user to see messages indicating states of the robot lawnmower 10. The user interface system 170 is also in communication with the controller 150. In some embodiments, the user interface system 170 is not located on the robot body 100. Instead, the user interface system 170 can be a standalone unit, separate from the robot body 100. In other implementations, the user interface system can be integrated into another device, such as via a software located on a user's cell phone, tablet, or other device and the robot can communicate with the user interface via radio; for example, a Wi-Fi signal over the internet.

Figure 2:
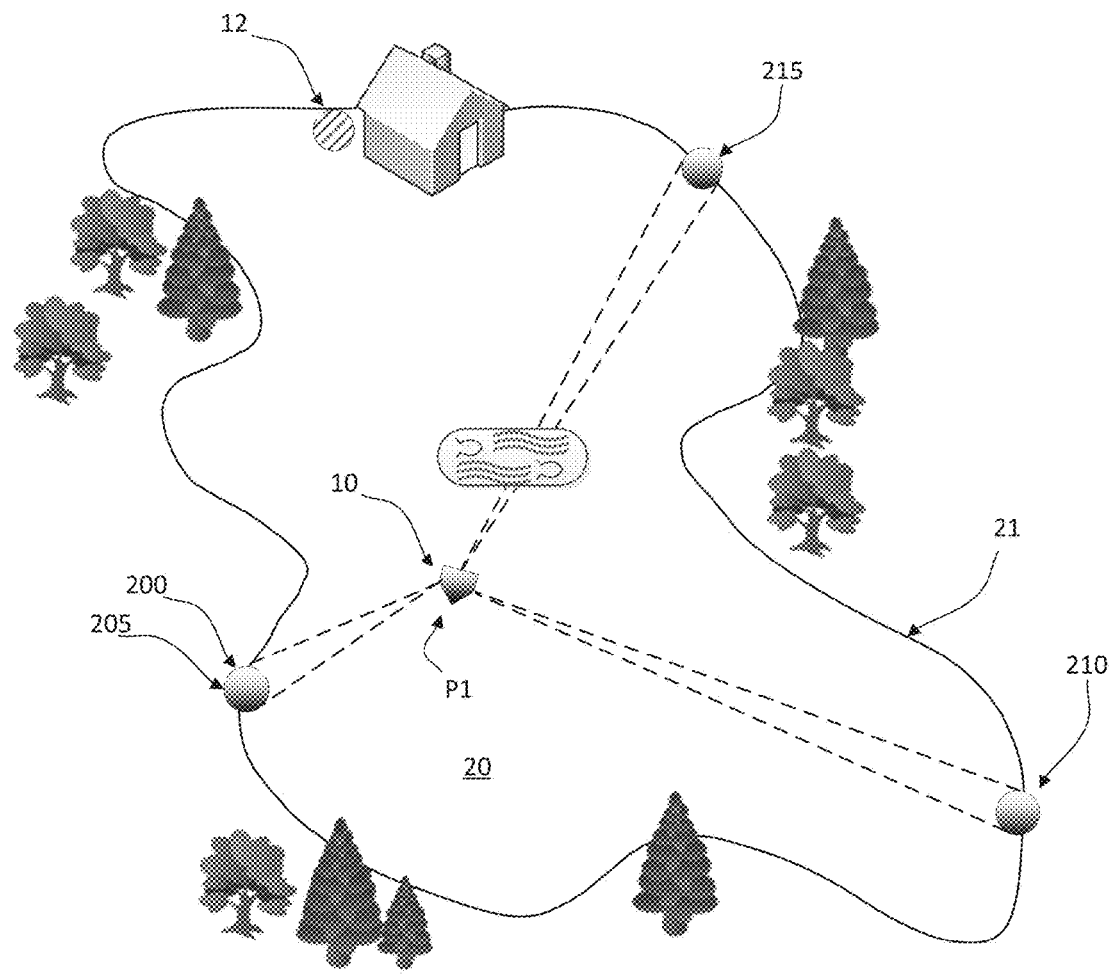
FIG. 2 is a schematic view of an autonomous mobile mowing robot detecting retroreflective beacons.

Referring to FIG. 2, for mowing operations the robot lawnmower 10 is placed on the lawn 20 so that it can mow the lawn 20 which is bounded by perimeter 21. The robot lawnmower 10 is constrained to not travel outside of the perimeter 21. To demark the perimeter 21, one or more boundary markers 205, 210, and 215 can be placed in or around the lawn 20. For example, boundary markers 205, 210, 215 are positioned on the lawn 20 along the perimeter 21. The dock 12 can also function as a boundary marker and include a synthetic retro-reflective surface. The boundary markers 200 may include lidar retroreflectors, radar retroreflectors, or passive materials/configurations configured to reflect a signal generated by the robot lawn mower 10. In general, the boundary markers 200 are passive devices and do not actively emit signals. Rather they are positioned to reflect signals emitted from the robot lawn mower 10. In some examples, the boundary markers 200 are retroreflectors, e.g., a device or surface configured to reflect radiation back to its source with a limited amount of scattering. Because the boundary markers 200 are passive, they can provide the advantage of being independent of a power source and do not have to include a battery or be connected to a source of power. While only three boundary markers 200 are shown in FIG. 2, any number of boundary markers can be positioned about the lawn 20.

Each boundary marker 205, 210, 215 is positioned at a location, and situated so as to be detected by the robot lawnmower 10 as the robot lawnmower 10 navigates the lawn 20. To determine its position on the lawn 20, as shown schematically in FIG. 2, the robot lawnmower 10 communicates with the individual boundary markers 205, 210, 215. If each of the boundary markers 205, 210, 215 is available to the robot lawnmower's line-of-sight and within the reach of the signal, the robot lawnmower 10 can determine its pose based on its location relative to the three or more boundary markers 205, 210, 215.

As shown in FIG. 2, the robot lawnmower 10 can receive a signal reflected from each of the boundary markers 205, 210, 215. In one implementation, the boundary markers are passive retroreflective markers. After the robot lawnmower 10 sends a signal from radiation sources 194, 180 and receives the reflected signal via detectors 190, 196, the controller 150 can calculate a range and bearing to each boundary marker 205, 210, 215. The detectors can be e.g., radar antenna, or laser light detectors. In some implementations, the controller can use trigonometry to better estimate the position P1 of the robot. In some implementations, dock 12 could also serve as a reflective beacon.

In other implementations, boundary markers 205, 210, 215 can be configured as optical corner reflectors, or corner cubes. An optical corner reflector is a retroreflector consisting of three mutually perpendicular intersecting flat surfaces. Each surface reflects incident radiation emitted by emitters 180, 194 on the robot lawnmower 10 back directly towards the source, e.g., to be detected by the detectors 190, 196. Each incoming ray incident on the cube is reflected three times, once by each surface, which results in a reversal of direction. The three intersecting surfaces often have square shapes, and can be made of three-sided glass prisms.

In general, the pose of the robot lawnmower 10 can be determined based on the signals reflected by the boundary markers 205, 210, 215. More particularly, the robot lawnmower 10 sends a signal (e.g., a laser signal) that is reflected by one of the boundary markers. The robot lawnmower 10 can determine the angle between the robot lawnmower 10 relative to the boundary marker based on the location at which the signal is received. Additionally, the robot lawnmower 10 can determine the distance between the robot lawnmower 10 and the boundary marker 200 based on the time-of-flight between the sending of the signal and the receipt of the reflected signal. Thus, based on the information from multiple boundary markers 200, the robot lawnmower's pose can be determined by trilaterating based on received range/heading information from each of the boundary markers. In general, trilateration is the process of determining absolute or relative locations of points by measurement of distances, using the geometry of circles, spheres or triangles. In one example, trilaterating can be based on a least squares algorithm using the distance/time-of-flight measurements. In another example, time-of-flight can be measured indirectly by measuring the phase shift between the signal and the receipt of the reflected signal.

In general, reflective beacons do not generate a signal that is uniquely identifiable—e.g., the signal from one beacon is not uniquely identifiable as originating from that beacon. However, if the system were to be able to distinguish between the signals generated by the beacons, this information could be used to determine the pose of the robot lawn mower. In some examples, the beacons can be configured to return a unique which is distinguishable from signals from other boundary markers. In some implementations, the unique signal can be implemented with a passive retroreflector, by e.g., a unique size, shape, or pattern to the boundary marker 200 or dock 12 that encodes the particular boundary marker. The unique signal permits the robot lawnmower 10 to uniquely identify the signal as being associated with a particular beacon.

In another example, signals and information about the environment surrounding the beacon can be used to uniquely identify a particular beacon. More particularly, the environment around each of the beacons will differ and therefore generate a different reflective signal. For example, if one beacon is located near a tree, the tree will provide a weaker reflected signal at a distance relative to the beacon. Thus, a scan matching process can use the combination of the signal reflected from the beacon and the signals reflected from environmental objects to uniquely identify the beacon.

Figure 3A:
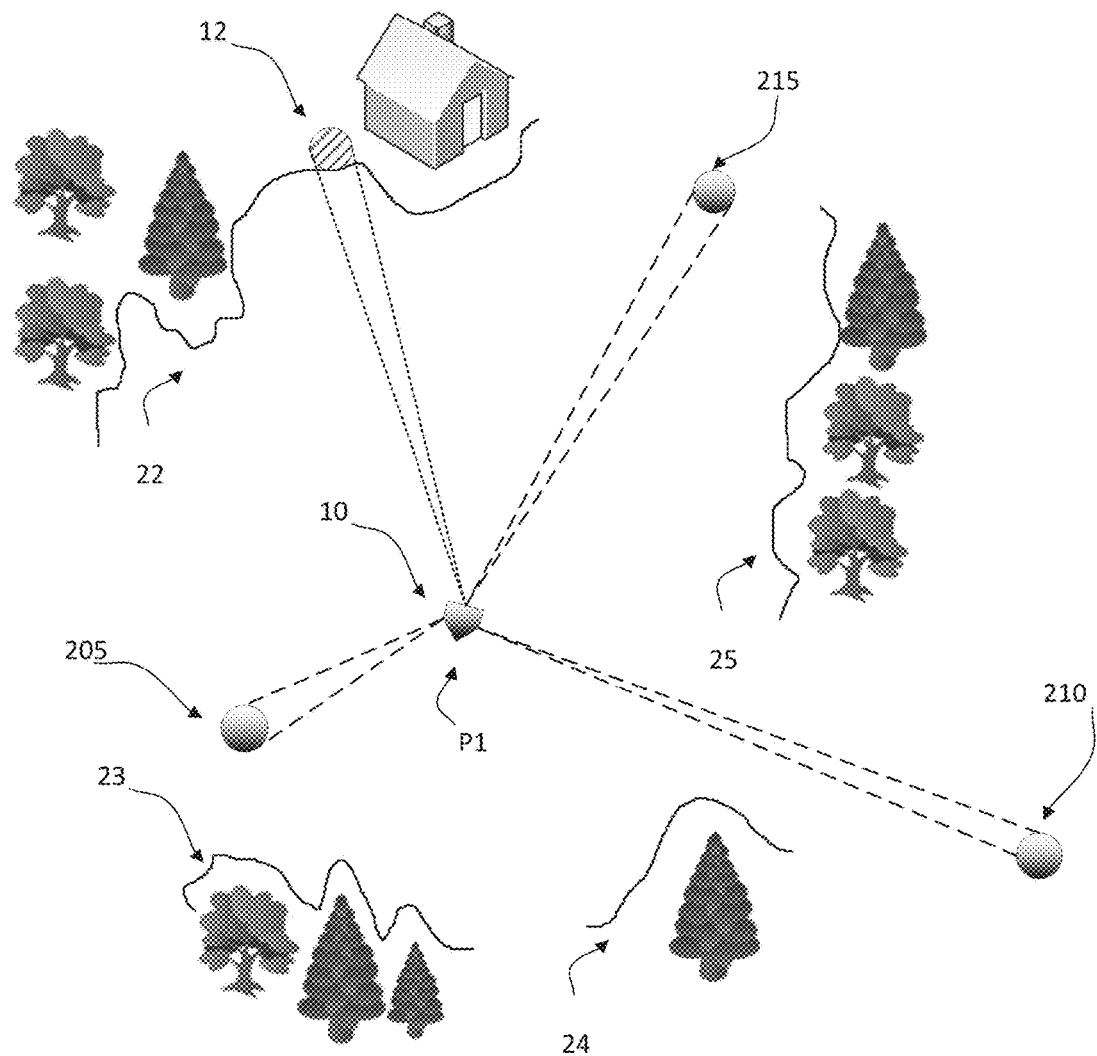
FIG. 3A is a schematic view of an autonomous mobile mowing robot detecting the environment at a first pose.

Scan matching involves taking and storing scan data of the environment. In some implementations, the location determination performed by the robot lawnmower 10 includes performing a scan match on three or more adjacent boundary markers 200, where each of the three or more boundary markers 200 are individually identifiable by adjacent scan match data. More particularly, because the beacons are passive, the signal reflected from the beacon itself is not distinguishable from a signal reflected from another beacon. By combining the reflected signal from the beacon with a reflective signature of a scan around (e.g., 5 degrees on either side, 3 feet on either side) of the beacon, the beacon can be uniquely identified relative to the other beacons. For example, FIG. 3A shows the robot lawnmower 10 at a first pose P1. The robot lawnmower 10 emits signals to locate each of the boundary markers 205, 210, 215, as well as the dock 12. In addition, the robot lawnmower 10 can use the emitted signal (or emit another signal) to scan the environment, and store the at least a portion of the radiation signature of the environment at that pose P1 in the robot's memory 151. The radiation signature of the environment is due to and is specific for different obstacles within or near the lawn 20, e.g., radiation signatures 22, 23, 24, 25 due to trees or buildings surrounding the lawn 20. A radiation signature surrounding each of the beacons can be stored and associated with the beacon. Thus, the robot lawnmower 10 can use the fingerprint (e.g., the radiative signature) to uniquely identify each of the beacons. The robot lawnmower essentially takes a "fingerprint" of the environment at pose P1.

As each scan performed by the robot at differing locations on the lawn 20 will result in signature reflections of varying strength, the robot lawnmower can determine its position or pose of the robot on the lawn 20 by matching the current travel path scan with stored travel path scans contained in the robot's memory 151.

Figure 3B:
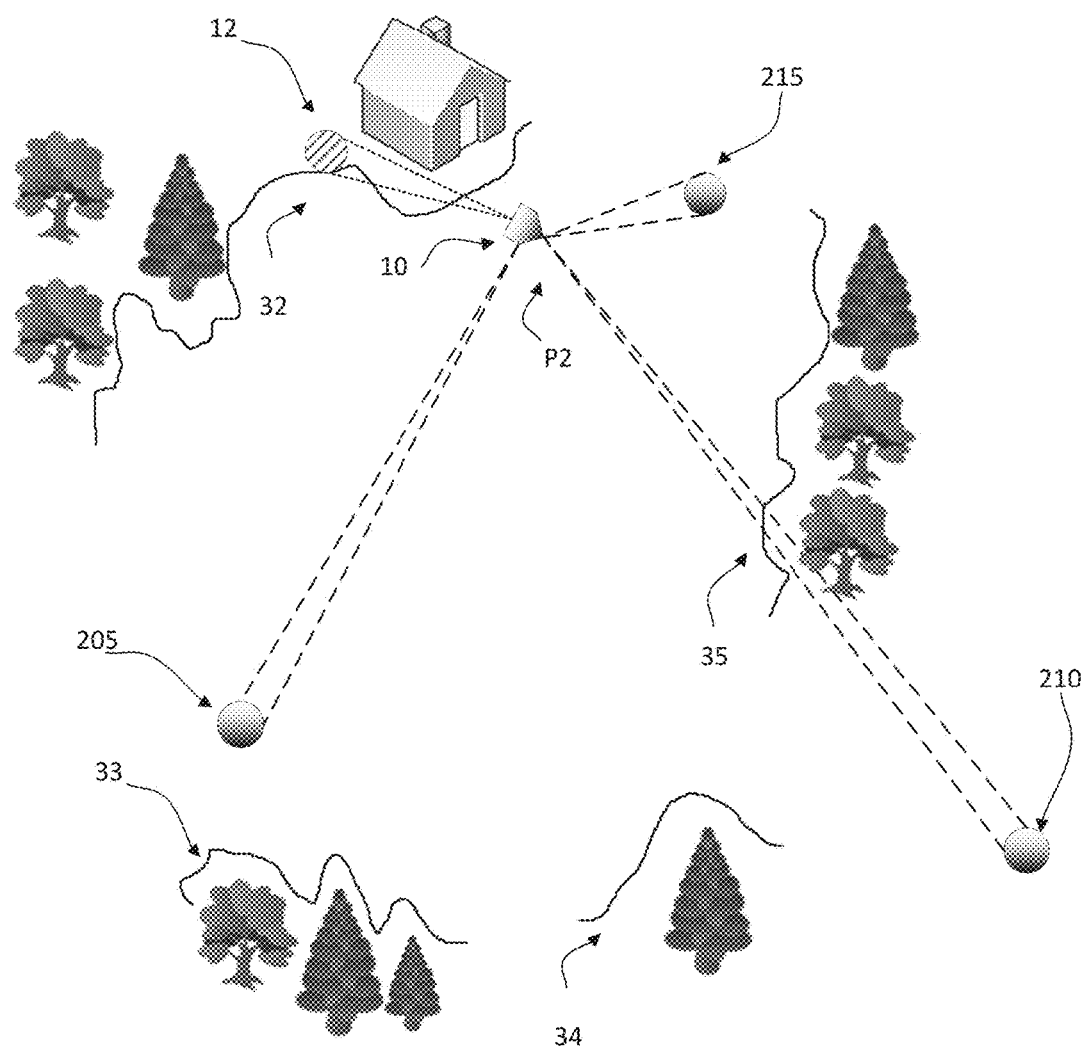
FIG. 3B is a schematic view of an autonomous mobile mowing robot detecting the environment at a second pose.

At the pose P2 of the robot lawnmower 10 in FIG. 3B, the robot lawnmower has changed its pose, both position and orientation, compared to the pose P1 of the robot lawnmower 10 in FIG. 3A. The radiation signatures 32, 33, 34, 35 of the same surrounding objects with appear different due to the change in aspect of the robot lawnmower 10. The robot lawnmower 10 would search its database to match the current scan at P2 to the scans in memory.

To increase computational efficiency, the robot lawnmower can use a library of signatures relating specifically to the boundary markers. The robot lawnmower 10 can scan the environment near the reflective boundary markers and identify specific features in the immediate vicinity of the particular boundary marker, 205, 210, 215, 12. This narrow scan range gives a partial fingerprint that is easier to match. To reduce computational cost the robot lawnmower 10 could be configured to scan a reduced signature library, or more quickly scan a library of stored locations using this specific signature.

In some implementations, each of the retroreflectors can have a unique signature based on a unique size, shape, or pattern to the reflector that encodes the particular boundary marker. The unique signal permits the robot lawnmower 10 to uniquely identify the signal and thus the location and orientation of dock 12. Based on identifying this unique retroreflector signal, the processor of the robot lawnmower 10 can select only the scans in memory containing the unique signal. In further implementations, the processor of the robot lawnmower can combine position information given by the unique signal and a scan match of the environment.

To perform scan matching, the robot lawnmower 10 can first "learn" the environment by taking scans of the entire lawn 20. In a learning mode, the robot can navigate the lawn, and record the fingerprint signature of radiation received at different poses on the lawn 20 to build a radiative signature library. A user may direct the robot lawnmower 10 during this learning mode. Alternatively, the robot lawnmower 10 can navigate and scan the environment autonomously, and build a library of stored scans for later retrieval. In some implementations, the robot lawnmower 10 can continuously update the stored scan library during mowing operations. This technique can account for variations in the signature scans due to changes in reflections caused by changes of objects in the environment over time.

Referring to FIGS. 3A and 3B, a combined triangulation technique uses scan matching to uniquely identify signals from respective boundary markers. The robot lawnmower can determine its general pose by calculating the angle and distance of the robot lawnmower 10 to the three or more boundary markers 200. The robot lawnmower 10 can also scan the environment near the reflective boundary markers 200 and identify specific features in the immediate vicinity of the particular boundary marker, 205, 210, 215, 12. This information can be used to uniquely identify and associate the signals with a particular boundary marker that is in a position. Thus, the use of the scan matching can increase the accuracy of the determined robot pose.

The triangulation techniques discussed above can potentially incur multipath error. Multipath error can occur due to objects placed within the environment. For example, radiation emitted from the robot lawnmower 10 could be reflected of objects such as a car, a bicycle, and then be incident on the robot lawnmower 10 as a false return signal. To account for these inaccuracies, robot lawnmower can be configured to perform both the query of the boundary markers 200 as well as a scan match at each pose of the robot lawnmower 10. The scan match can confirm that the reflected signal is from a boundary marker as opposed to another environmental feature.

Further embodiments of this disclosure relate to variable control of parameters of radiation, 196. In a preferred embodiment, the radiation source is a laser configured to spin about an axis and is connected to a controller that modulates the spin rate and/or power level of the laser. However, the control methods described can apply to either or both of laser radiation and radar radiation. The methods are designed to work in conjunction with retroreflectors, radar reflectors, or other reflective boundary markers 200. In particular, the arc length between the laser signals, the emitted signal strength, or both can be modified.

Signal is proportional to the inverse of the radius squared, where the radius is the distance between the robot lawnmower 10 and the object detected (e.g., the boundary marker 200). Thus, both strong and weak signals are incident on the detectors 190, 196, depending on the distance to the reflected surface. Radius also impacts the noise of the incoming signal, e.g., closer signals are typically less noisy. In addition, the surface upon which the light is incident can reflect a varying amount of the signal. For example, the signals reflected by retroreflective beacons are extremely strong, and can be much higher than signals due to other objects in the environment such as trees or bricks. Thus, a high detected signal can indicate the position of a retroreflector. To account for these variations in signal strength, the robot lawnmower can adjust the radiation emitted. Additionally, if the radiation source is configured to generate a signal at a predefined frequency, the likelihood of receiving a reflection from an item located nearer to the robot is greater than the likelihood of receiving a reflection from an item located further away because as the distance from the robot increases so does the arc length between the signals.

In one implementation, the robot lawnmower 10 does a first sweep to scan the lawn 20 at a first rate, and stores the locations of higher signal and/or reduced noise as areas of interest. The robot lawnmower 10 then performs a second sweep to scan the lawn during which the robot slows the scan and focuses on the detected areas of interest determined by the increase in signal strength on the first sweep. More particularly, the controller issues a command to cause the laser or radar to rotate at a slower rate in the determined areas of interest such that a greater amount of information can be generated in those areas (e.g., the scan can include pings of the laser at smaller degree increments such as every 0.2-0.75 degrees as opposed to every one degree). In some examples, a ratio of the degree increments for the pings in the less focused (faster spin rate) scan versus the more focused (slower spin rate) scan can be between 0.1 and 0.8, for example, between 0.25 and 0.5. To ensure the robot is capturing the reflectors, the robot lawnmower 10 slows the scan around the expected positions of the boundary markers 200 in subsequent scans. The slower the rotation/spin rate, the more likely it is to see a small retroreflector from a further distance (e.g., in FIG. 3B, boundary marker 210 relative to the robot lawnmower 10 at position P2). If the scan rate slows, the robot can integrate over a longer time span and filter out more noise in order to see further obstacles. Further, if a scan matching technique is used to uniquely identify the boundary markers 200, the slower spin rate can collect more information about the environmental features surrounding the beacon due to the higher resolution of the generated data.

Figure 4A:
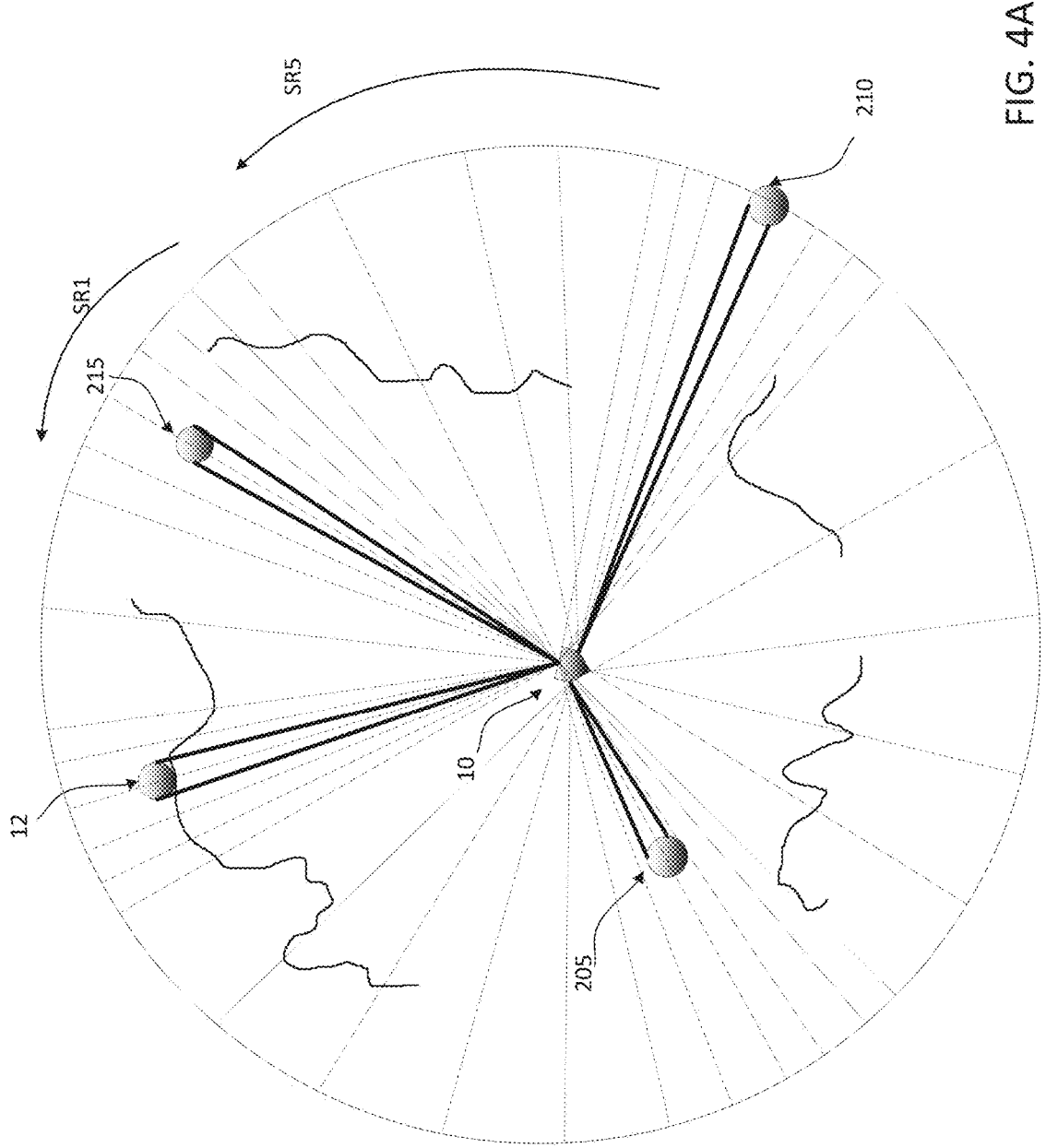
FIG. 4A is a schematic view illustrating a variable scan rate used by the autonomous mobile mowing robot of FIG. 1B.

In FIG. 4A, the robot lawnmower 10 has completed an initial sweep of the environment to detect the boundary markers. For example, a first scan include 360 pings of the laser at one degree increments at a rate of 5 Hz. Once these areas of interest have been determined, subsequent sweeps can focus on the area of interest, with the controller 150 changing the rotation/spin rate of the radiation to sweep areas of interest at a slower rate than areas of non-interest as identified on the first scan (e.g., by slowing the speed at which the laser rotates in areas of interest or increasing the speed at which the laser rotates in areas of non-interest as compared to the initial speed of rotation). SR5 is a scan rate, which quickly sweeps through the environment. A slower rotation/spin rate SR1 is used when passing through regions containing the boundary markers 200, such as the region surrounding boundary marker 215. SR1 is slower than SR5. For example, SR1 can be 5 to 30 Hz, typically 10 Hz. SR5 can be 0.1 to 5 Hz, typically 1 Hz.

In some examples, the robot can alternate between fast and slow spin rates. For example, the robot can perform one rotation at a first spin rate to gather detailed information about the robot location. The robot could then operate using a higher spin rate for the subsequent 5-10 rotations. In another example, the spin rate of the laser could be modified based on the proximity to the edge of the mowable space. For example, as the robot lawn mower approaches the boundary of the mowable space the speed at which the mower is propelled could be reduced. In addition, the speed at which the laser rotates could be reduced to gather a greater resolution in the data used to localize the robot lawn mower.

In a further embodiment, in FIG. 4B the spin rate is variable based on the distance to each retroreflector as well as compared to the areas of non-interest. Here, SR5 is the fastest spin rate, and quickly sweeps through the environment. Boundary markers 205, 210, 215 and dock 12 are all located at different distances from the robot lawnmower 10, and thus each boundary marker 200 can be scanned at a different scan rate, depending on the distance from the robot at that moment. For example, SR5>SR1>SR2>SR3>SR4, with closer areas of interest scanned at a faster spin rate than further areas of interest.

Referring to FIG. 5, a process 1000 for varying the rotation/spin rate is illustrated. The method described by 1000 starts at step 1010. The robot lawnmower 10 sweeps a pass (or fires in a round) doing a scan at a first rate (step 1020). During this first pass, the scan finds radar noise or retroreflectors, (i.e. identifies locations of interest). The robot lawnmower 10 then sweeps a pass with a slower spin rate setting in areas of interest for subsequent scans (step 1030). As the scan progresses, the robot 10 then determines if the area being scanned at a given moment is associated with portions of the environment other than boundary markers (step 1040). If no, the robot lawnmower 10 determines that the area being scanned is relatively less interesting, and increases the spin rate (or otherwise increases arc length between the firings of the laser in the scan) to relatively higher rates in areas not identified as containing any object of interest (step 1050). If at step 1040 the robot lawnmower 10 determines that the area includes boundary markers then it returns to sweeping at a slower spin rate using the shorter arc length between the firings of the laser in the scan (step 1030). Thus, the robot can continue to scan with the spin rate varying for a length of time (e.g., 3 seconds, 5 seconds, 10 seconds) and then re-determine areas of interest by returning to block 1020.

The robot lawnmower 10 can perform the positioning initial sweep at predetermined time periods or upon the detection of a beacon outside the slow spin rate zone. In some examples, a ratio of the fast spin rate to the slower spin rate can be between 2:1 and 5:1, e.g., about 2:1, about 3:1, about 4:1, about 5:1.

In some additional examples, rather than vary the spin rate during a particular rotation, the controller can cause the laser to spin with the spin rate alternating between the faster and slower spin rates after a set number of rotations. This can allow the robot to gather more information and potentially determine the robot's pose with greater detail during a slow spin rate scan while tracking the robot and any movements on a basis that is updated more frequently using the higher spin rate scans.

In other embodiments, to optimize object detection, the power level or beam focus of the radiation emitted from robot lawnmower 10 can be modulated. Generally, lower power is preferable for identifying objects nearby than far away and high power is better for detecting signals from objects further away. High power output results in noise on close obstacles, while seeing objects further away clearly. If operating on low power alone, the robot lawnmower may not be able to detect further away objects. To try and capture the advantages of both power levels (while minimizing the disadvantages) the robot lawnmower 10 can be configured to change the power level of the emitted radiation on various positions during a sweep.

If strongly reflecting targets are close to the robot (at a given position) and the boundary markers 200 are farther away, the robot lawnmower 10 can use the received signal strength for that beacon to change the power level up or down. For example, the robot may increase the power level of the signal where the boundary marker 200 is expected to be, or has previously determined to be located. If the return signal strength is low, the robot will increase the power in an attempt to detect the boundary marker 200 that has been drowned out by the closer (and therefore higher signal) reflecting target.

Figure 6:
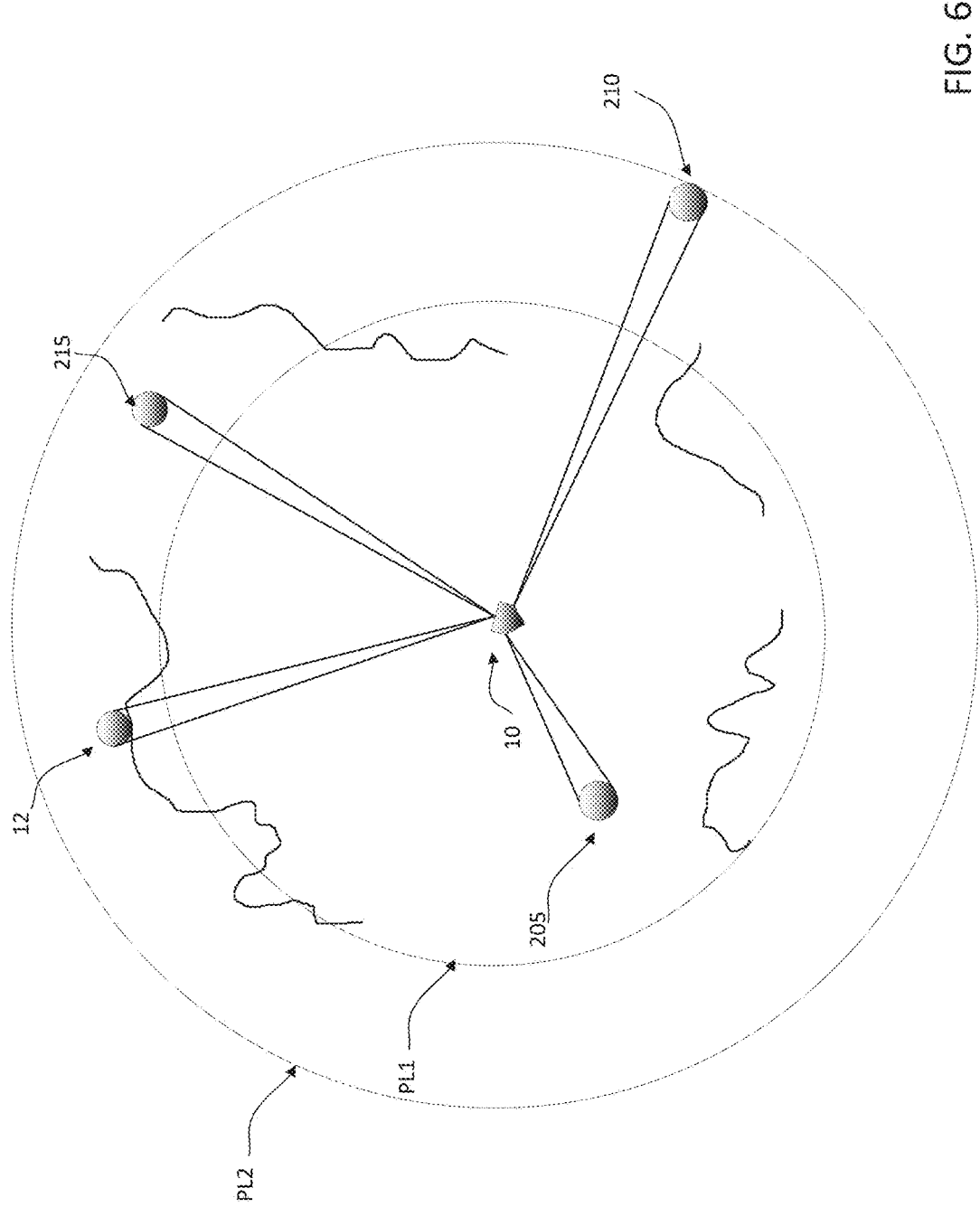
FIG. 6 is a schematic view illustrating a variable power level used by the autonomous mobile mowing robot of FIG. 1B.

Referring to FIG. 6, the power of the radiation emitted by radiation source (e.g., the laser) on the lawnmower 10 can vary, with first power level (e.g., as shown by circle PL2 which has a greater diameter than circle PL1) being less than a second power (e.g., as shown by circle PL2 which has a greater diameter than circle PL1). The lower power (PL1) is generally used for closer obstacles, while the high power (PL2) is generally used to identify further obstacles.

Figure 7:
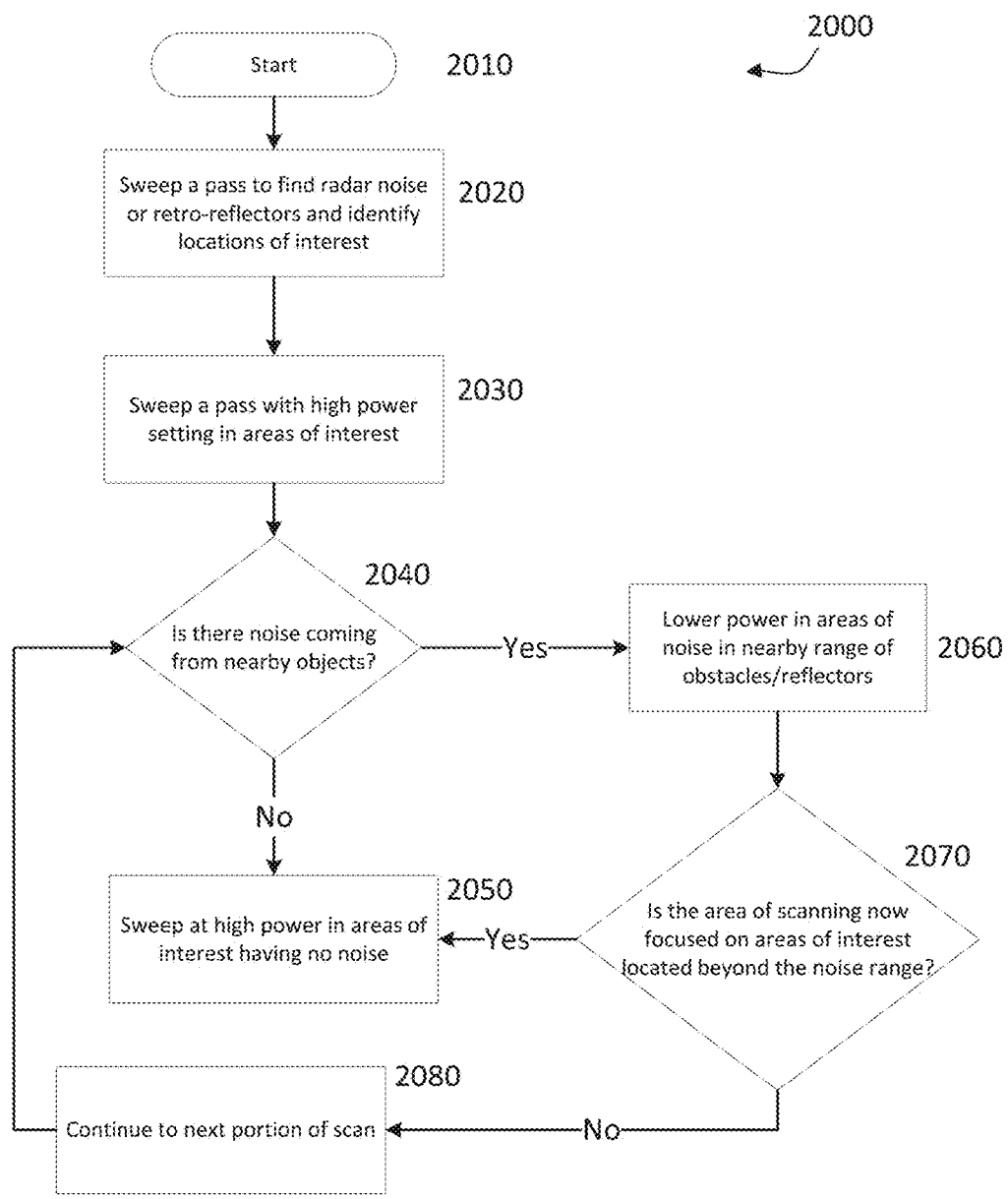
FIG. 7 is a flowchart describing a method for implementing the variable power level used by the autonomous mobile mowing robot.

Referring to FIG. 7, a method for varying the radiation power level to determine both near/far and strong/weak signals is illustrated. Method 2000 starts at step 2010. The robot lawnmower 10 sweeps a first pass (or fires in a round) at a lower power level (step 2020). During this first pass, the low power scan finds radar noise or retroreflectors, i.e. identifies location(s) of interest such as the boundary markers 200. The robot lawnmower 10 then sweeps a pass with a higher power setting in areas of interest (step 2030). As the scan progresses, the robot 10 then determines if noise is being detected from nearby objects (step 2040). If not, the robot lawnmower 10 continues sweeping at high power in areas of interest having no noise (e.g., looking for farther away targets) (step 2050). If yes, the robot lawnmower 10 lowers the power in the area that is detected to have noise (step 2060). The robot lawnmower 10 then determines if the area scanned on focuses on areas of interest located beyond the noise range (step 2070). If yes, the robot continues sweeping at high power in areas of interest having no noise (step 2050). If not, then the sweep continues on the next portion of scan (step 2080), and returns to checking if noise being detected from nearby objects (step 2040).

In some examples, a controller 150 in communication with the laser or other radiation source is configured to perform scans at alternating power levels. For example, rather than vary the power level during a particular rotation, the controller 150 can cause the laser to alternate between the two power levels after a set number of rotations. This can allow the robot to gather more information and potentially determine the robot's pose with greater detail because both nearby and further away objects will be located based on the two different scan power levels.

Retroreflector surfaces such as boundary markers generally have a much stronger signal than do environmental objects. To account for the differing strength of detected signals resulting from different object types, as well as from distance, different detection schemes are possible. For example, detector 190 on the front of the robot body can be composed of two different detectors. Similarly, detector 196 on the rear of the robot body 100 can actually be composed of two detectors Each pair of detectors can include one detector configured to detect lower power signals and one detector configured to detect higher power signals. In one implementation, filtered glass placed in front of detectors can attenuate the signal incident on the detectors making it more tuned to detecting high signals (e.g., returned from the boundary markers 200).

Detectors 193, 197 can be specifically tuned to detect boundary markers 200 and thus dedicated to determining robot positioning within the environment, while detectors 190, 194 can be tuned to detect nearby obstacles within the environment. The front detectors 193 and 190 could be stacked on top each other, as can the rear detectors 196, 197.

In further implementations, the front emitter 190 can actually be configured as two emitters 190, 191. Each emitter can be specially tuned to emit a high or lower power level, rather than modifying a single emitter to change its power. Similarly, the rear emitter 194 can actually be configured as two emitters 194, 195.

In other implementations, a single detector on the front 190 and back 196 can be used. The controller 150 can adjust the gain up and down in coordination with the expected strength of the detected signals.

One variation which can be used with embodiments including laser radiation accounts for terrain variations that can cause robot lawnmower 10 to change its pitch, i.e., tilt the robot body 100 up and down, as the robot lawnmower 10 traverses the lawn 20. These variations can make the laser miss the boundary markers by looking too high or too low. Additionally, laser signals are typically emitted as discrete signals, which might miss a boundary marker if the laser has positionally scanned by the boundary marker between successive laser pulses. To increase the likelihood of the emitted laser beam encountering a boundary marker, the laser signal can be fanned out into a plane.

Figure 8A:
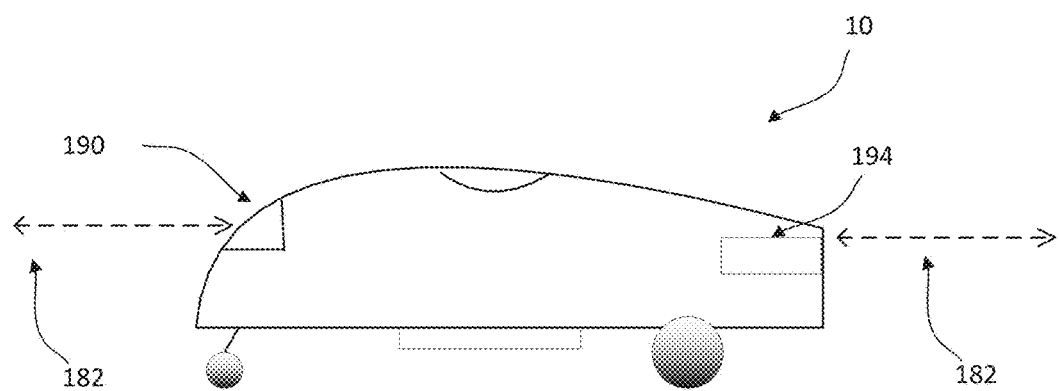
FIGS. 8A and 8B are side and top views of an autonomous mobile mowing robot detecting its environment with a horizontally fanned laser.
Figure 8B:
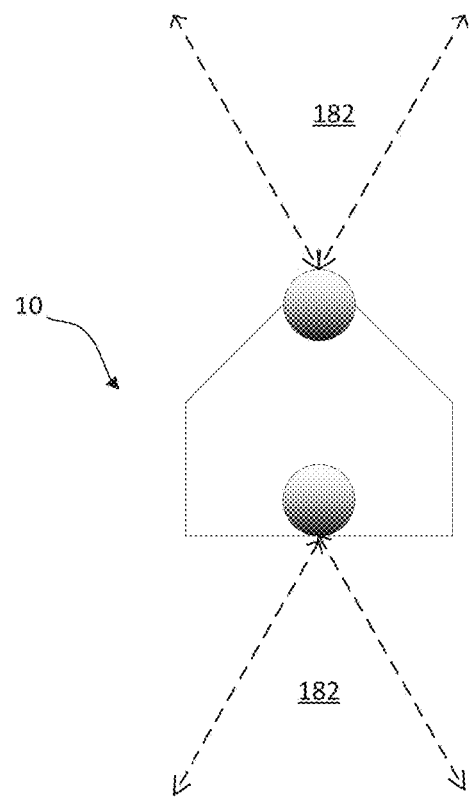

Referring to FIGS. 8A-8B, the emitters 190, 194 can be configured to fan the emitted laser signal 182 horizontally, producing a planar laser signal that extends out left and right relative to the robot body 100. As the signal 182 sweeps out over a 2D plane, discrete pulses of the planar signal are much more likely capture a boundary marker 200. In one example, a passive optical component can be placed in front of the laser beam and provide beam shaping. For example, a cylindrical lens or array of lenses can be used to generate a fanned beam from the laser. In some examples, the optical component can generate a fanned beam having an angular width that is between 5 degrees and 10 degrees.

Figure 9A:
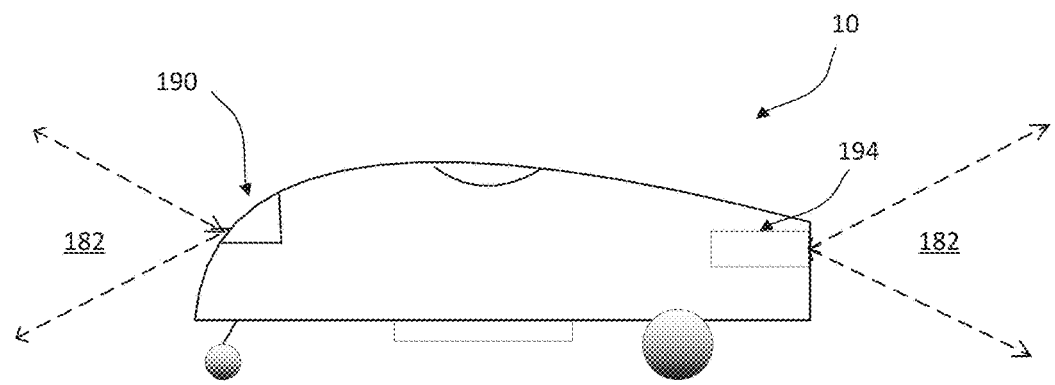
FIGS. 9A and 9B are side and top views of an autonomous mobile mowing robot detecting its environment with a vertically fanned laser.
Figure 9B:
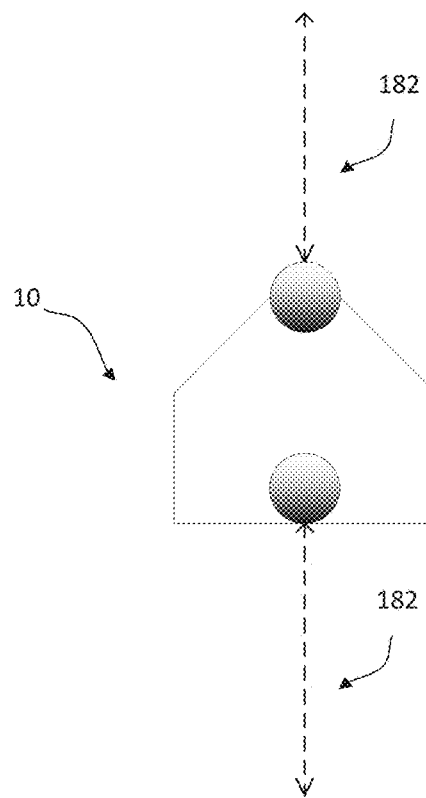

In an alternate embodiment, referring to FIGS. 9A-9B, the emitters 190, 194 can be configured to fan the emitted laser signal 182 vertically, producing a planar signal that extends up and down. A vertically fanned signal is advantageously more likely to hit a boundary marker 200 since the up and down signal will encounter the boundary marker 200 regardless of the up and down and pitch of robot body 100. In one example, a passive optical component can be placed in front of the laser beam and provide beam shaping. For example, a cylindrical lens or array of lenses can be used to generate a fanned beam from the laser. In some examples, the optical component can generate a fanned beam having an angular width that is between 5 degrees and 10 degrees.

Figure 10A:
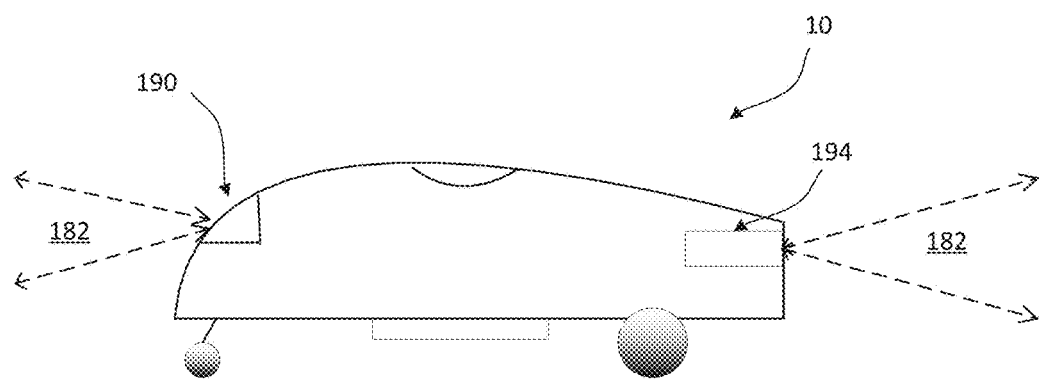
FIGS. 10A and 10B are side and top views of an autonomous mobile mowing robot detecting its environment with a diagonally fanned laser.
Figure 10B:
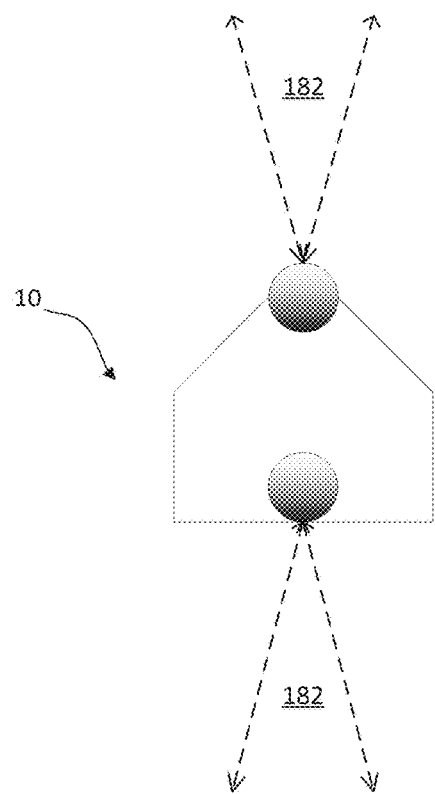

Referring to FIGS. 10A-10B, the emitters 190, 194 can be configured to fan the emitted laser at an angle 45° relative to both the horizontal and vertical. The resulting diagonal laser planar signal 182 includes the benefits of both horizontal and vertical laser sheets, by increasing the likelihood of discrete pulses of the laser hitting the boundary marker 200 and the pitch of the robot body 100 not impacting the ability of the laser signal 182 to hit the boundary marker 200. In one example, a passive optical component can be placed in front of the laser beam and provide beam shaping. For example, a cylindrical lens or array of lenses can be used to generate a fanned beam from the laser. In some examples, the optical component can generate a fanned beam having an angular width that is between 5 degrees and 10 degrees.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, other embodiments are within the scope of the following claims.

What is claimed is:

1. A method of estimating a location of a lawn mowing robot in an environment having a plurality of synthetic surfaces at known locations with respect to a mowable space in the environment, the method comprising:
   placing a lawn mowing robot in the environment, the lawn mowing robot comprising:
      a radiation source coupled to the lawn mowing robot;
      a detector coupled to the lawn mowing robot and configured to detect radiation reflected by objects in the environment;
      a modulator coupled to the radiation source and configured to modulate radiation emitted from the radiation source; and
      a controller configured to controllably direct radiation from the radiation source to scan the environment, and to vary at least one of an output power of the directed radiation or a scan rate of the directed radiation as a function of detected radiation reflected from one or more of the synthetic surfaces, wherein the controller is configured to direct the modulator to vary a radiation beam focus in response to detection of reflected radiation; and
   using the controller to controllably direct the radiation from the radiation source to scan the environment and determine the location of the lawn mowing robot based on the detected reflected radiation.

2. The method of claim 1, wherein the controller is configured to vary the scan rate of the radiation source.

3. The method of claim 1, wherein the controller is configured to direct the modulator to vary the output power of the radiation source in response to detection of reflected radiation.

4. The method of claim 3, wherein the modulator scans a portion of a second scan at a scan speed different from at least a portion of the scan speed of a first scan.

5. The method of claim 4, wherein the scan speed of the second scan is slower than the scan speed of the first scan.

6. The method of claim 1, wherein the controller scans the environment during a motion of the lawn mowing robot.

7. The method of claim 1, further comprising scanning the environment by rotating a portion of the radiation source.

8. The method of claim 1, further comprising:
   comparing, by the controller, data indicative of detected reflected radiation to stored data; and
   identifying a particular object as being associated with the stored data based on the comparison.

9. The method of claim 1, further comprising modulating the output power of the radiation source.

10. The method of claim 1, wherein a reduced radiation beam focus corresponds to a faster spin rate of the directed radiation, and an increased radiation beam focus corresponds to a slower spin rate of the directed radiation.

11. The method of claim 1, wherein a reduced radiation beam focus corresponds to pings of directed radiation at larger degree increments, and an increased radiation beam focus corresponds to pings of directed radiation at smaller degree increments.

12. The method of claim 11 in which a ratio of the degree increments for the pings in the increased radiation beam focus versus that of the reduced radiation beam focus is between 0.1 and 0.8.

13. The method of claim 1, wherein the controller is configured to fan the radiation source at an angle relative to both horizontal and vertical directions.

14. A method of estimating a location of a lawn mowing robot in an environment that includes a plurality of synthetic surfaces at known locations with respect to a mowable space in the environment, the method comprising:
   scanning a radiation source coupled to a lawn mowing robot present in the environment;
   receiving radiation, by one or more detectors of the lawn mowing robot, reflected by objects in the environment;
   varying an output power of the directed radiation as a function of the radiation reflected from one or more of the synthetic surfaces;
   varying a scan rate of the directed radiation, as a function of detected radiation reflected from one or more of the synthetic surfaces;
   estimating a location of the lawn mowing robot; and
   varying a beam focus of the radiation source as a function of detected radiation reflected from one or more of the synthetic surfaces.

15. The method of claim 14, wherein the radiation source is a laser.

16. The method of claim 14, wherein two or more detectors responsive to different wavelengths are employed to detect radiation.

17. The method of claim 14, wherein scanning comprises rotating a portion of the radiation source.

18. The method of claim 14, wherein a reduced radiation beam focus corresponds to a faster spin rate of the directed radiation, and an increased radiation beam focus corresponds to a slower spin rate of the directed radiation.

19. The method of claim 14, wherein a reduced radiation beam focus corresponds to pings of directed radiation at larger degree increments, and an increased radiation beam focus corresponds to pings of directed radiation at smaller degree increments.

20. The method of claim 19 in which a ratio of the degree increments for the pings in the increased radiation beam focus versus that of the reduced radiation beam focus is between 0.1 and 0.8.

21. The method of claim 14, comprising fanning the radiation source at an angle relative to both horizontal and vertical directions.

22. A lawn mowing robot for operating in an environment having a plurality of synthetic surfaces at known locations with respect to a mowable space in the environment, the lawn mowing robot comprising:
 a radiation source coupled to the lawn mowing robot;
 a detector coupled to the lawn mowing robot and configured to detect radiation reflected by objects in the environment;
 a modulator coupled to the radiation source and configured to modulate radiation emitted from the radiation source; and
 a controller configured to controllably direct radiation from the radiation source to scan the environment, vary at least one of an output power of the directed radiation or a scan rate of the directed radiation as a function of detected radiation reflected from one or more of the synthetic surfaces, direct the modulator to vary a radiation beam focus in response to detection of reflected radiation, and determine the location of the lawn mowing robot based on the detected reflected radiation.

23. The lawn mowing robot of claim 22, wherein the controller is configured to vary the scan rate of the radiation source.

24. The lawn mowing robot of claim 22, wherein the controller is configured to direct the modulator to vary the output power of the radiation source in response to detection of reflected radiation.

25. The lawn mowing robot of claim 24, wherein the modulator is configured to scan a portion of a second scan at a scan speed different from at least a portion of the scan speed of a first scan.

26. The lawn mowing robot of claim 25, wherein the scan speed of the second scan is slower than the scan speed of the first scan.

27. The lawn mowing robot of claim 22, wherein the controller is configured to scan the environment during a motion of the lawn mowing robot.

28. The lawn mowing robot of claim 22, wherein the controller is configured to controllably direct the radiation to scan the environment by rotating a portion of the radiation source.

29. The lawn mowing robot of claim 22, wherein the controller is configured to:
 compare data indicative of detected reflected radiation to stored data; and
 identify a particular object as being associated with the stored data based on the comparison.

30. The lawn mowing robot of claim 22, wherein the controller is configured to modulate the output power of the radiation source.

* * * * *